(12) United States Patent
Yoshida

(10) Patent No.: US 11,914,420 B2
(45) Date of Patent: Feb. 27, 2024

(54) DRIVE MECHANISM AND HEAD-MOUNTED DISPLAY

(71) Applicant: SONY GROUP CORPORATION, Tokyo (JP)

(72) Inventor: Takaaki Yoshida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 210 days.

(21) Appl. No.: 17/309,416

(22) PCT Filed: Nov. 18, 2019

(86) PCT No.: PCT/JP2019/045045
§ 371 (c)(1),
(2) Date: May 26, 2021

(87) PCT Pub. No.: WO2020/116140
PCT Pub. Date: Jun. 11, 2020

(65) Prior Publication Data
US 2022/0035400 A1     Feb. 3, 2022

(30) Foreign Application Priority Data
Dec. 6, 2018     (JP) .................................. 2018-229034

(51) Int. Cl.
*G06F 1/16*     (2006.01)
*G02B 27/01*    (2006.01)

(52) U.S. Cl.
CPC ......... *G06F 1/163* (2013.01); *G02B 27/0176* (2013.01); *G02B 27/0179* (2013.01)

(58) Field of Classification Search
CPC .......... G06F 1/163; G06F 3/011; G06F 3/012; G02B 27/0176; G02B 27/0179
See application file for complete search history.

(56) References Cited

U.S. PATENT DOCUMENTS

| 9,703,103 B2* | 7/2017 | Araki ................... G02B 27/028 |
| 2008/0196631 A1* | 8/2008 | Kosmowski ........... B23K 26/02 |
| | | 108/20 |
| 2012/0084948 A1 | 4/2012 | Breen et al. |
| 2015/0128384 A1 | 5/2015 | Breen et al. |

(Continued)

FOREIGN PATENT DOCUMENTS

| BR | 112013008611 A2 | 6/2016 |
| CA | 2813143 A1 | 4/2012 |

(Continued)

OTHER PUBLICATIONS

International Search Report and Written Opinion of PCT Application No. PCT/JP2019/045045, dated Feb. 18, 2020, 09 pages of ISRWO.

(Continued)

*Primary Examiner* — Rockshana D Chowdhury
*Assistant Examiner* — Martin Antonio Asmat Uceda
(74) *Attorney, Agent, or Firm* — CHIP LAW GROUP

(57) ABSTRACT

A drive mechanism according to an embodiment of the present technology includes a base part, an elastic member, and a movable part. The elastic member is provided in the base part. The movable part includes a latching portion that is latched onto the elastic member and is movable relative to the base part.

12 Claims, 27 Drawing Sheets

(56) References Cited

U.S. PATENT DOCUMENTS

| | | | |
|---|---|---|---|
| 2016/0370590 A1 | 12/2016 | Fujishiro | |
| 2017/0103573 A1* | 4/2017 | Drinkwater | ........ G02B 27/0176 |
| 2018/0003984 A1 | 1/2018 | Lai et al. | |
| 2018/0024369 A1 | 1/2018 | Kato | |

FOREIGN PATENT DOCUMENTS

| | | | | |
|---|---|---|---|---|
| CN | 103180636 A | | 6/2013 | |
| CN | 104662466 A | | 5/2015 | |
| CN | 104977718 A | * | 10/2015 | ......... G02B 27/0176 |
| CN | 105807425 A | | 7/2016 | |
| CN | 106257320 A | | 12/2016 | |
| EP | 2627926 A1 | | 8/2013 | |
| EP | 3088768 A2 | | 11/2016 | |
| EP | 3261338 A1 | | 12/2017 | |
| JP | 09-280247 A | | 10/1997 | |
| JP | 11-339125 A | | 12/1999 | |
| JP | 2013044833 A | | 3/2013 | |
| JP | 2017-011436 A | | 1/2017 | |
| RU | 2013121591 A | | 11/2014 | |
| WO | 2012/051114 A1 | | 4/2012 | |
| WO | 2013/027714 A1 | | 2/2013 | |
| WO | WO-2013027714 A1 | * | 2/2013 | ......... G02B 27/0176 |
| WO | 2015/137165 A1 | | 9/2015 | |
| WO | 2016/132974 A1 | | 8/2016 | |
| WO | 2017/113487 A1 | | 7/2017 | |

OTHER PUBLICATIONS

Extended European Search Report of EP Application No. 19893286.5, dated Jan. 4, 2022, 09 pages.

* cited by examiner

DRIVE MECHANISM AND HEAD-MOUNTED DISPLAY

CROSS REFERENCE TO RELATED APPLICATIONS

This application is a U.S. National Phase of International Patent Application No. PCT/JP2019/045045 filed on Nov. 18, 2019, which claims priority benefit of Japanese Patent Application No. JP 2018-229034 filed in the Japan Patent Office on Dec. 6, 2018. Each of the above-referenced applications is hereby incorporated herein by reference in its entirety.

TECHNICAL FIELD

The present technology relates to a drive mechanism and a head-mounted display (hereinafter, HMD). More particularly, the present technology relates to a drive mechanism using a highly-slidable elastic member and to an HMD including this drive mechanism.

BACKGROUND ART

In the past, a position adjusting mechanism that adjusts the relative position of a display unit relative to a mounting part to be mounted on a head of a user in a wearable device such as an HMD has been known.

For example, Patent Literature 1 describes a position adjusting mechanism in which a plurality of comb-leaf-shaped protrusions arranged on a locking member attached to a frame and a plurality of protrusions of a member to be locked attached to a display unit engage with each other in a locked condition to regulate relative movement between the frame and the display unit. The member to be locked in the position adjusting mechanism is connected to an unlocking member provided in the display unit, and sliding the unlocking member releases the engagement of the locking member and the member to be locked, making it possible to adjust the relative position of the display unit relative to the frame.

CITATION LIST

Patent Literature

Patent Literature 1: WO 2015/137165

DISCLOSURE OF INVENTION

Technical Problem

However, in the position adjusting mechanism as described in Patent Literature 1, the position adjustment of the display unit relative to the mounting part is not stepless, but is multi-step adjustment depending on the pitch of the protruding portions of the locking member. As a result, the relative position of the display unit relative to the mounting part cannot be a position desired by the user in some cases.

In this regard, the present disclosure proposes a drive mechanism that is capable of steplessly adjusting the relative position of the display unit relative to the mounting part and holding the display unit at the adjusted position.

Solution to Problem

In order to achieve the above-mentioned object, a drive mechanism according to an embodiment of the present technology includes: a base part; an elastic member; and a movable part.

The elastic member is provided in the base part.

The movable part includes a latching portion that is latched onto the elastic member and is configured to be movable relative to the base part.

The latching portion may be a protrusion that protrudes toward the elastic member and deforms the elastic member.

The latching portion may have an abutment surface that abuts the elastic member, and the abutment surface may include a rib that bites into the elastic member.

The latching portion may have at least one of a triangular shape or a semicircular shape.

The movable part may include a plurality of the latching portions.

The elastic member may include a first elastic portion and a second elastic portion having a hardness higher than that of the first elastic portion.

The elastic member may include a first elastic portion and a second elastic portion having a width of the latching portion in a protruding direction larger than that of the first elastic portion.

The elastic member is formed in a columnar shape and has a sliding surface abutting the latching portion, and the latching portion may cause the sliding surface to slide along a longitudinal direction of the elastic member.

The base part may include a holding portion that holds a pair of elastic members facing each other along a protruding direction of the latching portion, and the movable part may be configured to be slidable on the base part while causing the latching portion to bite into the sliding surface along the longitudinal direction between one elastic member of the pair of elastic members and the other elastic member.

The base part may include a regulating portion that regulates sliding of the movable part along the longitudinal direction.

The drive mechanism may be a rotating mechanism in which the movable part is configured to be rotatable relative to the base part.

The drive mechanism may be a slide mechanism in which the movable part is configured to be movable relative to the base part along a direction perpendicular to a protruding direction of the latching portion.

In order to achieve the above-mentioned object, a head-mounted display according to an embodiment of the present technology includes: a display unit; a mounting part; and a drive mechanism.

The mounting part is to be mounted on a head of a user.

The drive mechanism includes a base part, an elastic member, and a movable part.

The base part is provided in the mounting part.

The elastic member is provided in the base part.

The movable part connects the base part and the display unit to each other.

The movable part includes a latching portion that is latched onto the elastic member and is configured to be movable relative to the base part.

MODE(S) FOR CARRYING OUT THE INVENTION

Hereinafter, embodiments of the present technology will be described with reference to the drawings. Note that the X-axis, the-Y axis, and the-Z axis represent three-axis directions perpendicular to each other, and are common in all drawings in this specification. Note that in this specification, the X direction is defined as the "right direction", the −X direction is defined as the "left direction", the Y direction is defined as "rear", the −Y direction is defined as "front", the Z direction is defined as the "upward direction", and the −Z direction is defined as the "downward direction". Further, the direction from the side of an elastic member 30 to the side of a housing space 14, which will be described below, is defined as "inside", and the direction opposite thereto is defined as "outside".

First Embodiment

Figure 1:
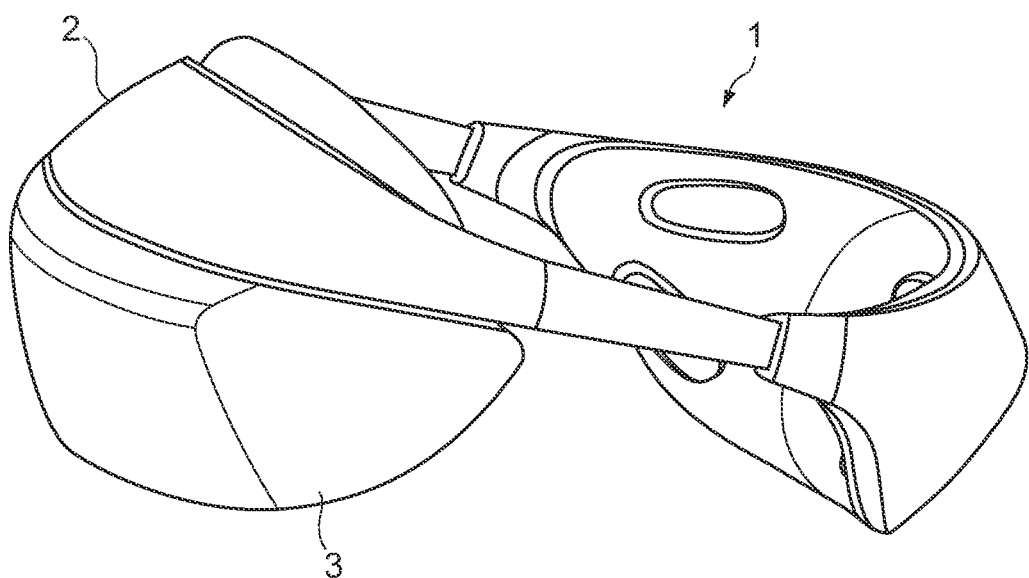
FIG. 1 is a diagram showing a configuration of an entire HMD.

FIG. 1 is a diagram showing a configuration of an entire HMD 1 to which a drive mechanism according to a first embodiment of the present technology is applied. The drive mechanism according to the first embodiment is provided, for example, between a mounting part 2 to be mounted on the head of a user and a display unit 3, and is a slide adjusting mechanism configured to be capable of adjusting the relative position of the display unit 3 relative to the mounting part 2.

Configuration of Entire Drive Mechanism

Figure 2:
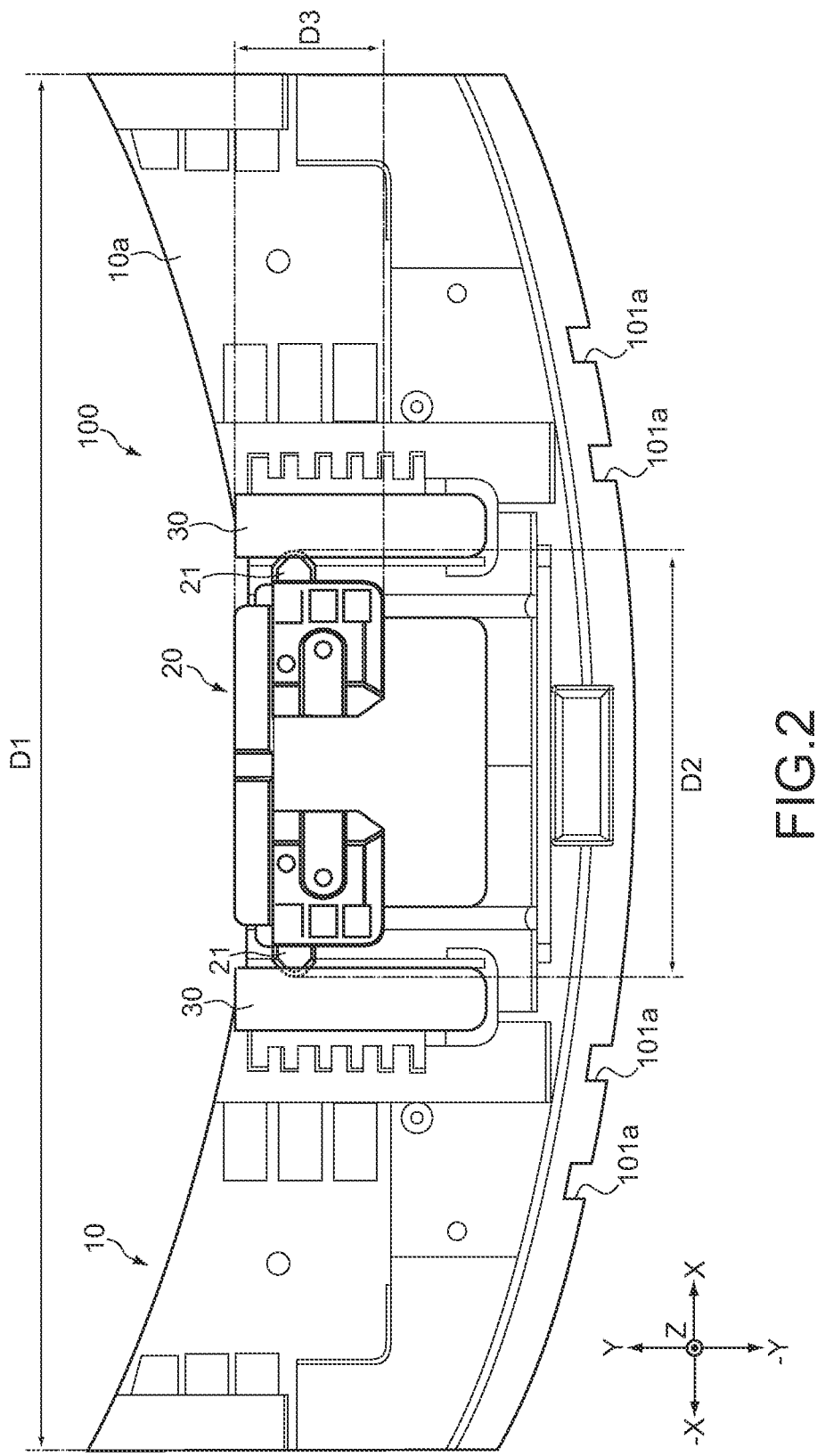
FIG. 2 is a diagram showing a configuration example of a drive mechanism according to a first embodiment of the present technology.

FIG. 2 is a diagram showing a configuration example of a drive mechanism 100 according to the first embodiment of the present technology. As shown in FIG. 2, the drive mechanism 100 includes a slide base part 10, a slider 20, and an elastic member 30.

Figure 3:
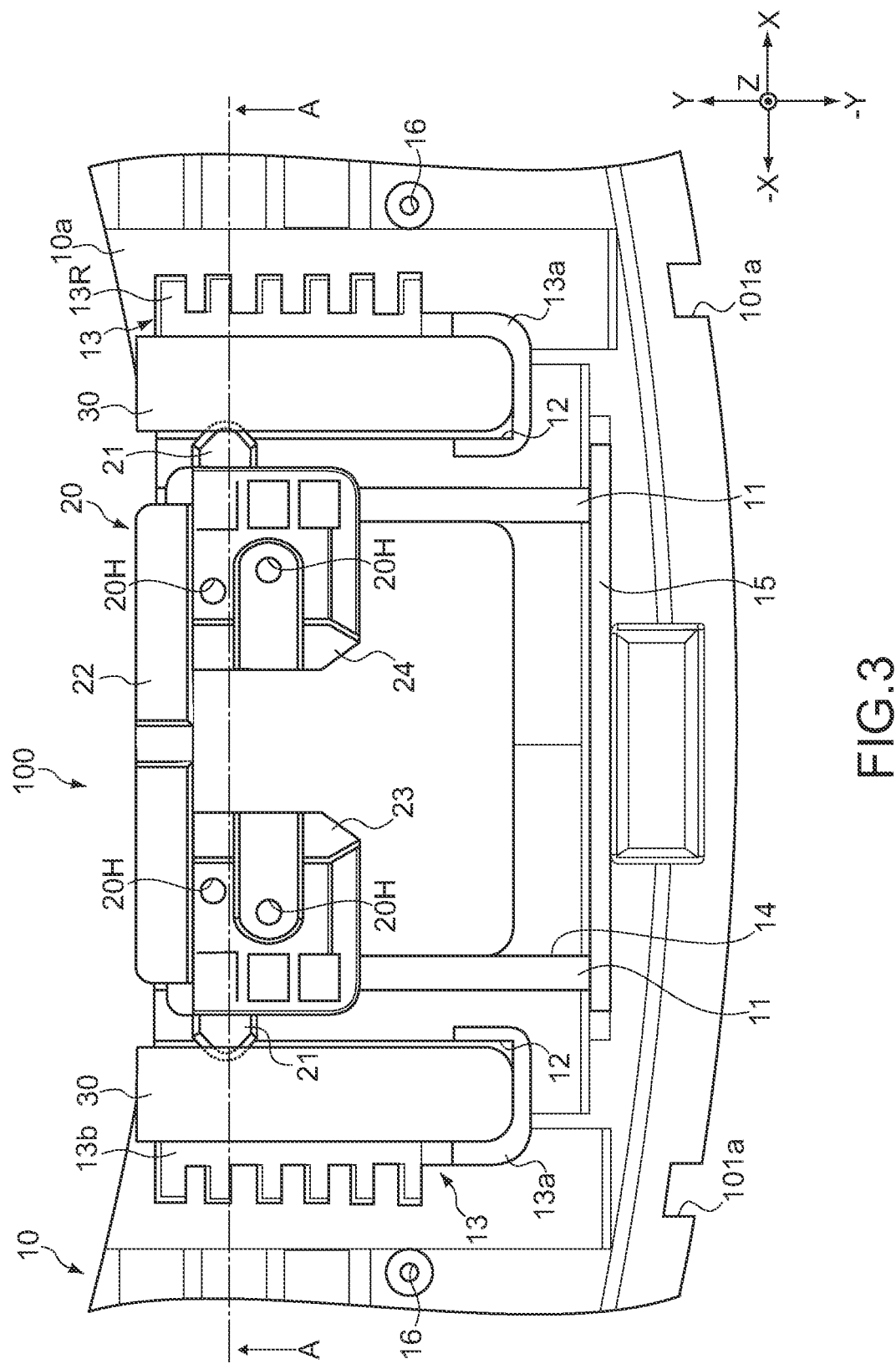
FIG. 3 is an enlarged top view showing a main part of the drive mechanism.
Figure 4:
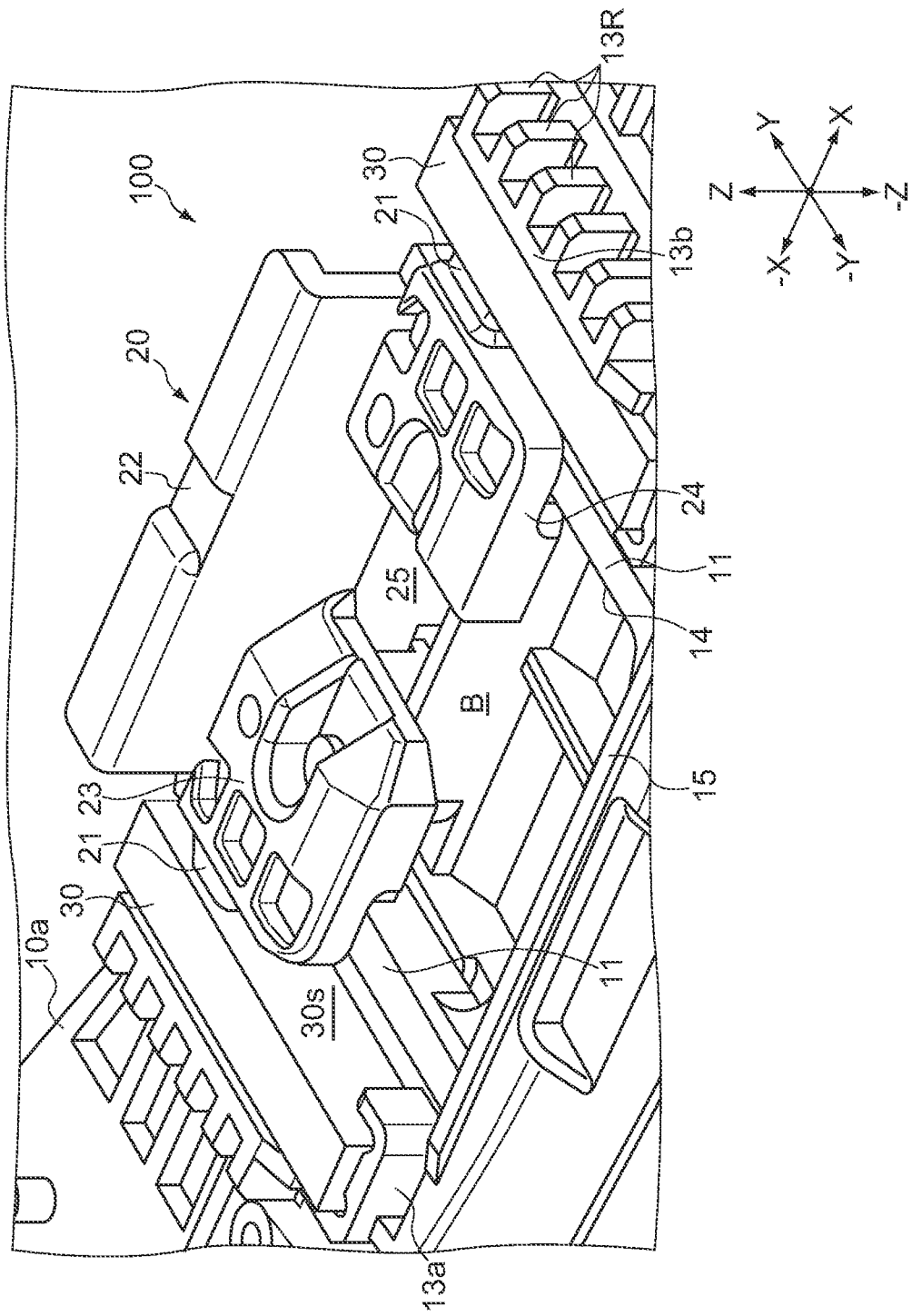
FIG. 4 is an enlarged perspective view showing the drive mechanism.

FIG. 3 is an enlarged top view showing a main part of FIG. 2, and FIG. 4 is an enlarged perspective view showing the main part of FIG. 2. Further, FIG. 5 is a schematic cross-sectional view taken along the line A-A in FIG. 3.

(Slide Base Part)

Figure 5:
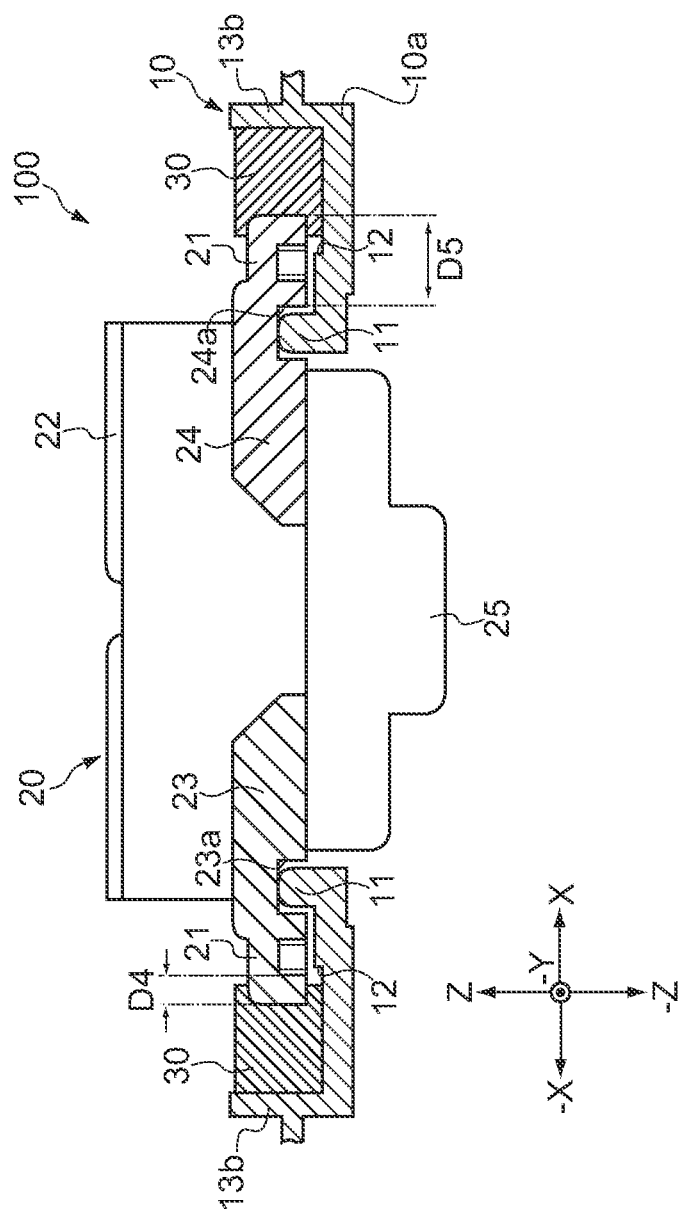
FIG. 5 is a cross-sectional view taken along the line A-A in FIG. 3.

As shown in FIG. 3 to FIG. 5, the slide base part 10 includes a slide base part body 10a, a guide-rail portion 11, a housing portion 12, a holding portion 13, a housing space 14, a first stopper 15, and a screw hole 16. Although there is no particular limitation on the material forming the slide base part 10, for example, a PC+ABS resin (polycarbonate/acrylonitrile/butadiene/styrene mixture) or the like can be employed. The slide base part 10 is an example of the "base part" in the claims.

The slide base part body 10a is formed in a flat plate shape curved to the front. As shown in FIG. 2, the slide base part body 10a includes a plurality of notches 101a opened to the front. A width D1 of the slide base part body 10a in the X-axis direction is not particularly limited, but is, for example, several tens to several hundred millimeters. The guide-rail portion 11, the housing portion 12, the holding portion 13, the housing space 14, the first stopper 15, and the screw hole 16 in this embodiment are provided integrally with the slide base part body 10a.

The guide-rail portion 11 includes a pair of columnar bodies having the longitudinal direction in the Y-axis direction and facing each other in the X-axis direction. The guide-rail portion 11 is located on the inside of the elastic member 30. The guide-rail portion 11 protrudes in the upward direction, and supports the slider 20 (first and second sliding portions 23 and 24). As a result, the guide-rail portion 11 has a function of guiding the slider 20 to move (slide) along the Y-axis direction. The guide-rail portion 11 is an example of the "regulating portion" in the claims.

The housing portion 12 is provided between a plate-like portion 13b and the guide-rail portion 11 and is a rectangular recessed portion that takes the longitudinal direction in the Y-axis direction. The housing portion 12 abuts the entire main surface of the elastic member 30 in the downward direction. As shown in FIG. 4, the housing portion 12 houses the end of the elastic member 30 in the downward direction.

As shown in FIG. 3 and FIG. 4, the holding portion 13 partially surrounds the housing portion 12. The holding portion 13 includes a U-shaped portion 13a and the plate-like portion 13b. The U-shaped portion 13a is opened to the rear and abuts the front end surface of the elastic member 30. The plate-like portion 13b is provided integrally with the U-shaped portion 13a, and abuts the main surface of the elastic member 30 in the right direction or the left direction.

Here, as shown in FIG. 4, the plate-like portion 13b is provided integrally with a plurality of reinforcing ribs 13R. The plurality of reinforcing ribs 13R is provided at predetermined intervals in the Y-axis direction, and connects the plate-like portion 13b and the slide base part body 10a to each other. With this configuration, the holding portion 13 is capable of positioning the elastic member 30 to which a weight is applied from the slider 20 in the X-axis direction at a predetermined position in the housing portion 12, and a drag on the weight is applied from the elastic member 30 to the slider 20.

The housing space 14 a rectangular space including the pair of guide-rail portions 11 and the first stopper 15. As shown in FIG. 5, the housing space 14 houses the end in the downward direction of a first sliding portion 23 located in the right direction from the guide-rail portions 11, the end in the downward direction of a second sliding portion 24 located in the left direction from the guide-rail portions 11, and a second stopper 25 of the slider 20.

The first stopper 15 is formed in a plate shape that takes the longitudinal direction in the X-axis direction, and faces the front end surfaces of the first and second sliding portions 23 and 24 in the Y-axis direction. As a result, the first stopper 15 abuts the front end surfaces of the first and second sliding portions 23 and 24 at the stopping position of the slider 20 FIG. 13B), and functions as a stopper that regulates movement of the slider 20 in the Y-axis direction.

As shown in FIG. 3, a plurality of screw holes 16 is provided in the slide base part body 10a on the outside of the elastic member 30. A screw (not shown) to be screwed to the mounting part 2 is inserted through the screw hole 16. In this embodiment, a screw (not shown) is inserted through the screw hole 16 and screwed to the mounting part 2, thereby fastening the mounting part 2 and the slide base part 10 (slide base part body 10a).

(Slider)

As shown in FIG. 2 to FIG. 4, the slider 20 is located on the inside of the elastic member 30 and includes a connecting portion 22, the first and second sliding portions 23 and 24, and the second stopper 25. A width D2 of the slider 20 in the X-axis direction and a width D3 in the Y-axis direction are not particularly limited. For example, the width D2 may be on the order of tens to hundreds of millimeters, and the width D3 may be on the order of tens of millimeters. The slider 20 is an example of the "movable part" in the claims.

Further, although there is no particular limitation on the material forming the slider 20, for example, a polyacetal resin or the like can be employed. Alternatively, the slider 20 may be formed of a metallic material or the like.

The connecting portion 22 extends in the X-axis direction, and is formed in an L-shape protruding in the upward direction than the first and second sliding portions 23 and 24.

In this embodiment, the display unit 3 is attached to the connecting portion 22, whereby the display unit 3 and the slide base part 10 are connected to each other via the slider 20.

The first and second sliding portions 23 and 24 face each other at a predetermined interval in the X-axis direction, and are supported by the connecting portion 22. Further, the first and second sliding portions 23 and 24 respectively include recessed portions 23a and 24a that lie across the guide-rail portion 11 and are opened in the downward direction. The recessed portions 23a and 24a abut the end surface in the upward direction of the guide-rail portion 11. As a result, the first and second sliding portions 23 and 24 are supported by the guide-rail portion 11.

As shown in FIG. 3, each of the first and second sliding portions 23 and 24 includes a plurality of screw holes 20H. In this embodiment, a screw (not shown) is inserted through the display unit 3 attached to the connecting portion 22 and screwed to the screw hole 20H, thereby fastening the slider 20 and the display unit 3.

As shown in FIG. 2 to FIG. 5, each of the first and second sliding portions 23 and 24 includes a protruding portion 21. As shown in the figures, the protruding portion 21 protrudes toward the outside, and is latched onto the side surface in the right or left direction of the elastic member 30. A pair of protruding portions 21 is provided in the slider 20, and faces each other in the X-axis direction via the first and second sliding portions 23 and 24. A width D5 of the protruding portion 21 in the X-axis direction is not particularly limited, but is, for example, approximately several millimeters.

As shown in FIG. 5, the protruding portion 21 according to this embodiment is latched onto the side surface of the elastic member 30 in the X-axis direction. At this time, a biting width D4 of the protruding portion 21 with respect to the elastic member 30 is not particularly limited, but is typically approximately several millimeters. The protruding portion 21 is an example of the "latching portion" in the claims.

Further, the protruding portions 21 are provided integrally with the first and second sliding portions 23 and 24, and are typically formed of the same material as those of the first and second sliding portions 23 and 24. However, the present technology is not limited thereto, and the protruding portions 21 may be formed of different materials. Further, the shapes and numbers of the protruding portions 21 are not particularly limited, and various forms can be taken. Variations of the protruding portion 21 will be described below.

Regarding Protruding Portion

Figure 6A:
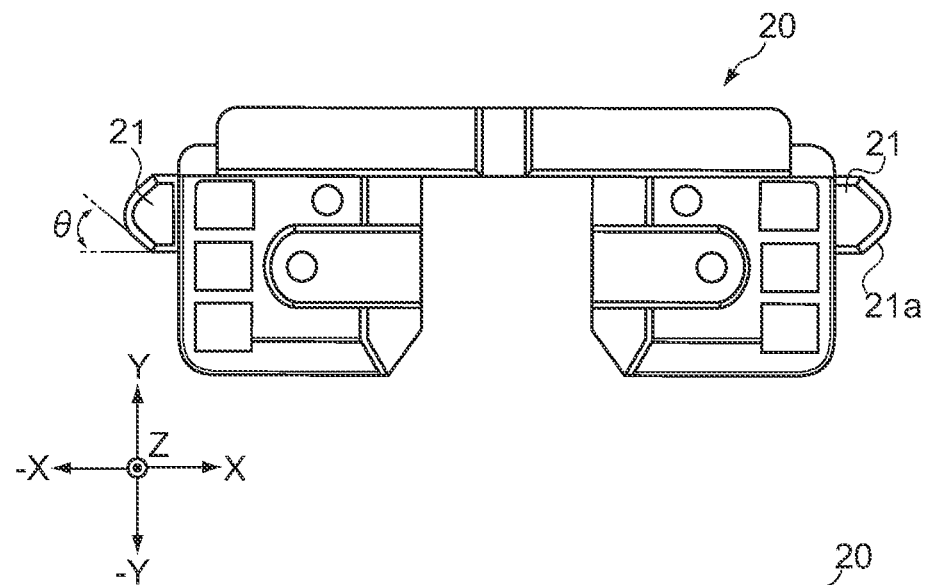
FIGS. 6A, 6B, and 6C is a are diagrams showing variations of a protruding portion.
Figure 6B:
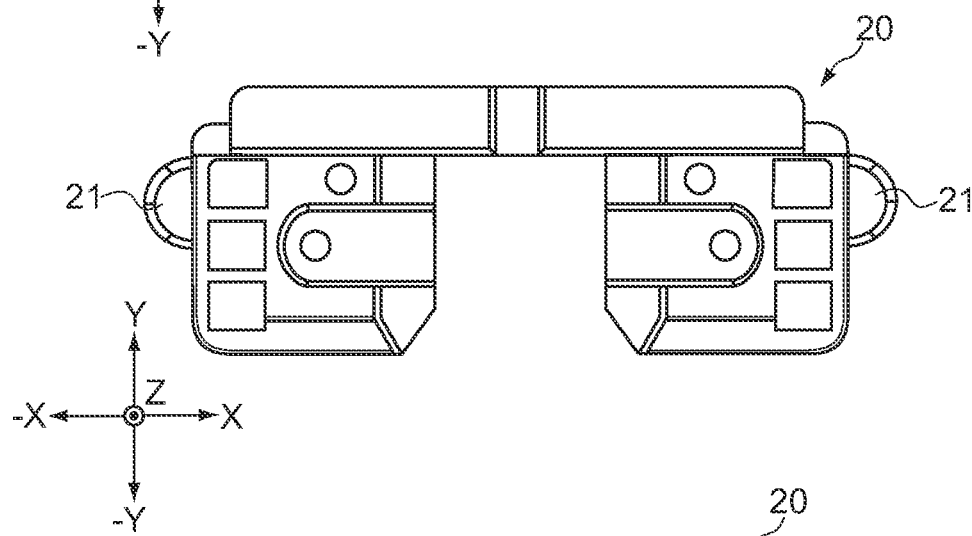
Figure 6C:
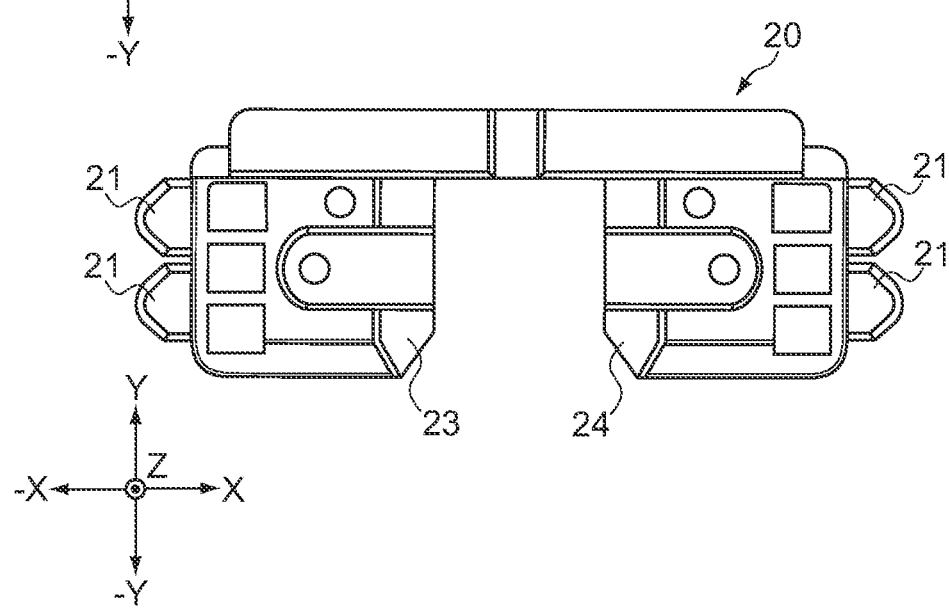
Figure 7A:
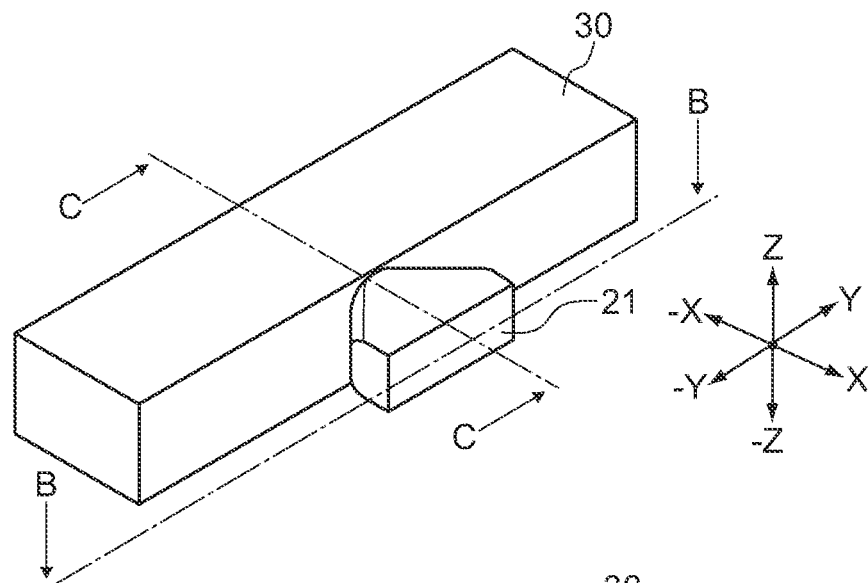
FIGS. 7A, 7B, and 7C is a are diagrams showing variations of the protruding portion.
Figure 7B:
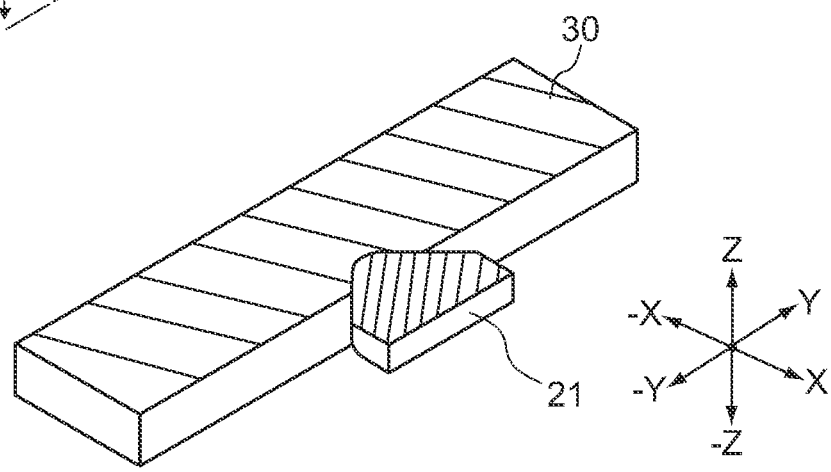
Figure 7C:
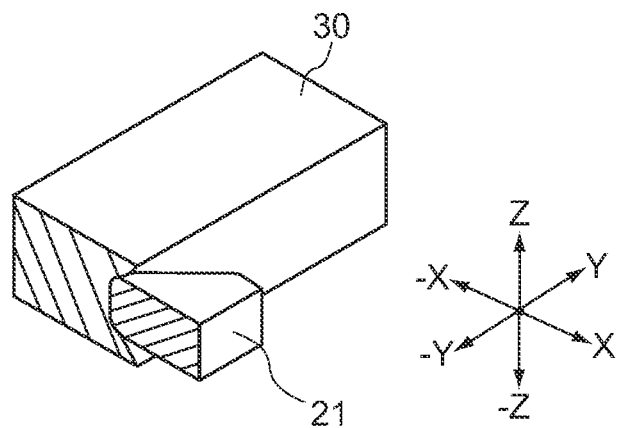
Figure 8A:
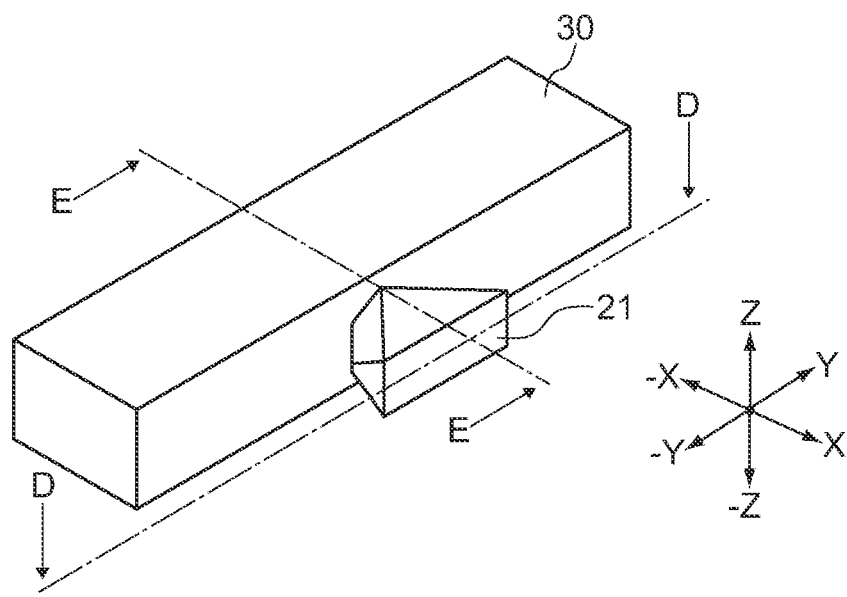
FIGS. 8A, 8B, and 8C is a are diagrams showing variations of the protruding portion.
Figure 8B:
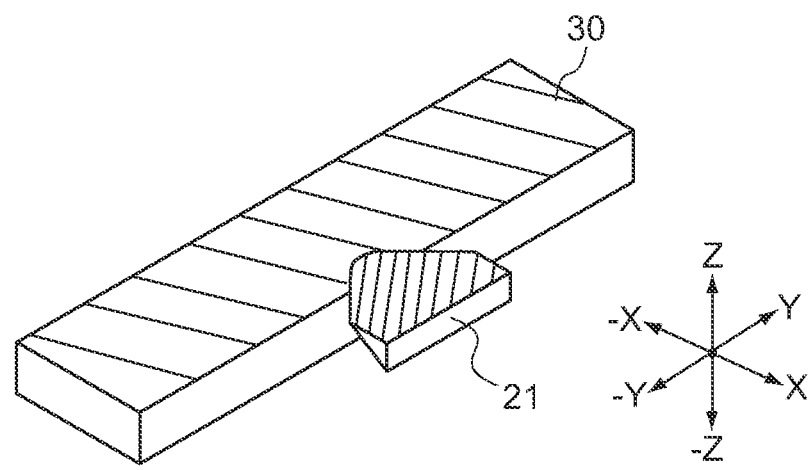
Figure 8C:
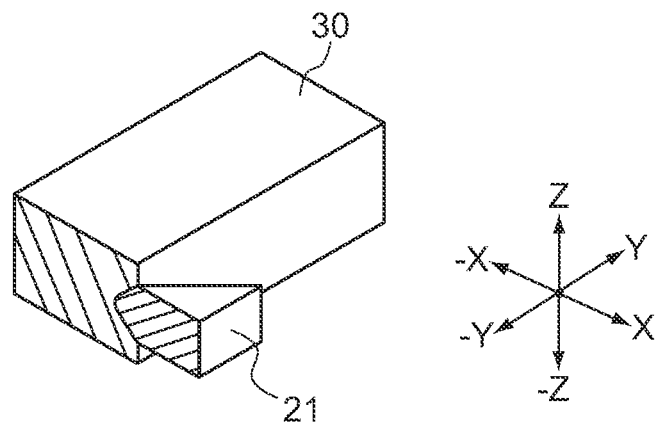
Figure 9A:
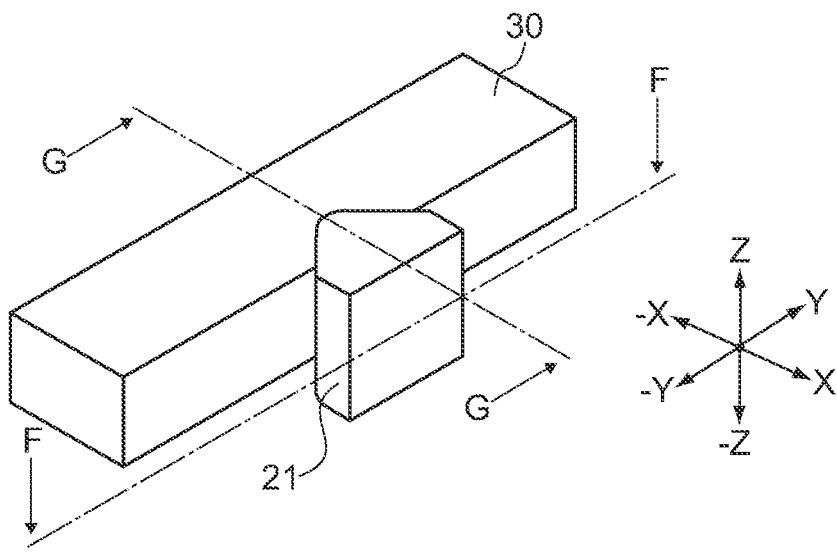
FIGS. 9A, 9B and 9C is a are diagrams showing variations of the protruding portion.
Figure 9B:
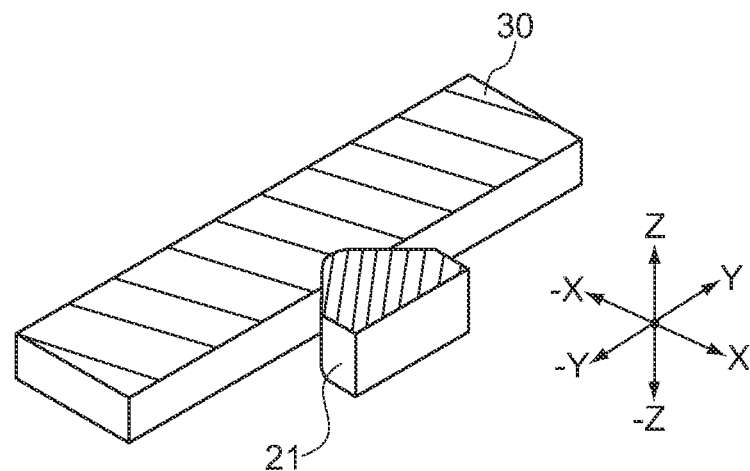
Figure 9C:
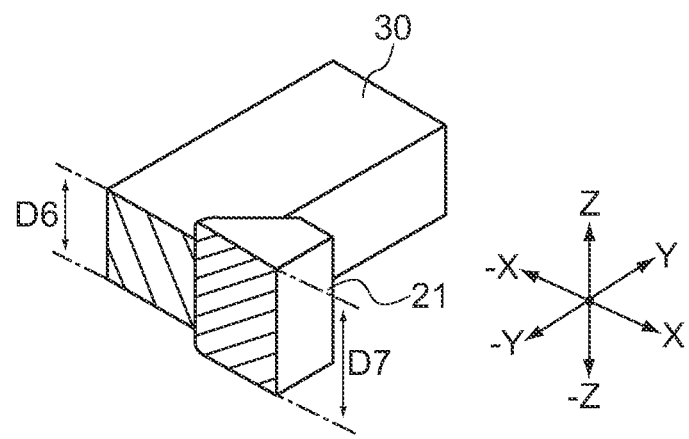
Figure 10A:
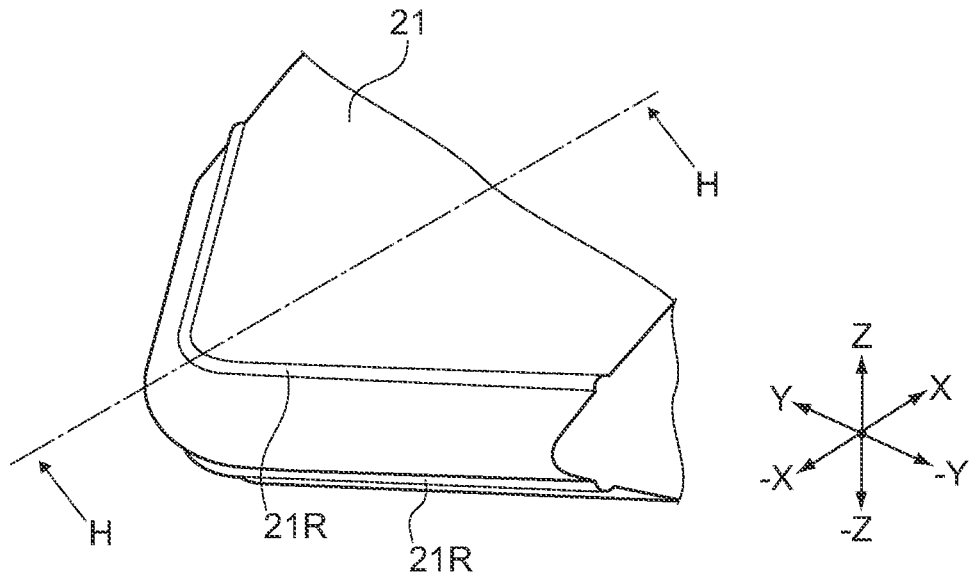
FIGS. 10A and 10B is a are diagrams showing variations of the protruding portion.
Figure 10B:
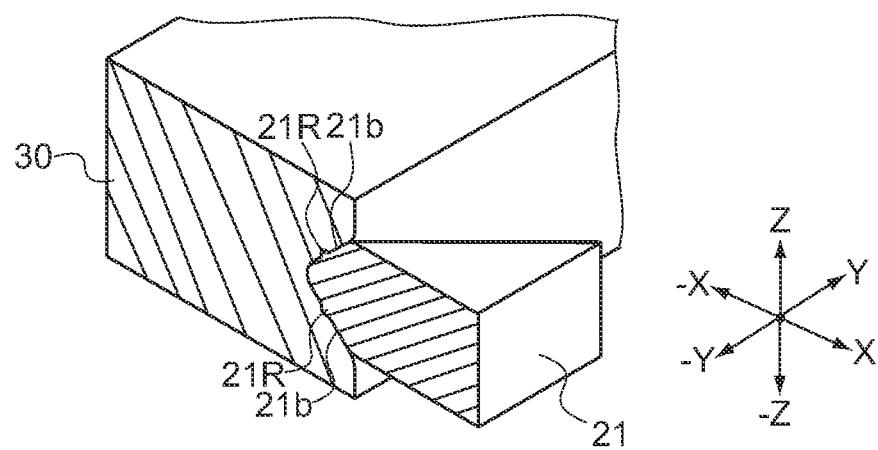

FIGS. 6A, 6B, 6C, 7A, 7B, 7C, 8A, 8B, 8C, 9A, 9B, 9C, 10A, and 10B are each a diagram showing variations of the protruding portion 21, FIGS. 6A 6B, and 6C are top views of the slider 20, and FIGS. 7A, 7B, 7C, 8A, 8B, 8C, 9A, 9B, 9C, 10A, and 10B are each a perspective view. Further, FIG. 7B is a cross-sectional view taken along the line B-B in FIG. 7A, and FIG. 7C is a cross-sectional view taken along the line C-C in FIG. 7A. Further, FIG. 8B is a cross-sectional view taken along the line D-D of FIGS. 8A, 8B, and 8C, and FIG. 8C is a cross-sectional view taken along the line E-E in FIG. 8A. In addition, FIG. 9B is a cross-sectional view taken along the line F-F in FIG. 9A, and FIG. 9C is a cross-sectional view taken along the line G-G in FIG. 9A. Further, FIG. 10A is an enlarged perspective view of the protruding portion 21, and FIG. 10B is a cross-sectional view taken along the line H-H in FIG. 10A.

The protruding portion 21 according to this embodiment may have a triangular shape as shown in FIG. 6A. In this case, it is favorable that an inclination angle θ of an inclined surface 21a of the protruding portion 21 (the angle between the inclined surface 21a and the longitudinal direction of the slider 20 be 40 degrees or more and 65 degrees or less.

Further, as shown in FIG. 6B, the shape of the protruding portion 21 may be a semicircular shape. In this embodiment, the shapes of the pair of protruding portions 21 are typically the same. However, the present technology is not limited thereto, and the pair of protruding portions 21 may have different shapes.

Further, as shown in FIG. 6C, a plurality of the protruding portions 21 may be provided in each of the first and second sliding portions 23 and 24. In this case, the number of protruding portions 21 provided in the first sliding portion 23 and the number of protruding portions 21 provided in the second sliding portion 24 may be the same or different from each other.

As shown in FIGS. 7A, 7B, and 7C, the protruding portion 21 may have a substantially pentagonal cross-section along the YX plane (FIG. 7B) and a substantially rectangular cross-section along the ZX plane (FIG. 7C). This configuration improves the sliding property when the protruding portion 21 slides while biting into the elastic member 30 (sliding surface 30s).

Further, as shown in FIGS. 8A, 8B, and 8C, the protruding portion 21 may have a substantially pentagonal cross-section along the YX plane (FIG. 8B) and a substantially pentagonal cross-section along the ZX plane (FIG. 8C). With this configuration, the biting quantity when the protruding portion 21 bites into the elastic member 30 increases, and the rattling in the Z-axis direction is suppressed.

Further, as shown in Part (c) of FIG. 9C, the protruding portion 21 may be configured such that a width D7 in the Z-axis direction is larger than a width D6 in the Z-axis direction of the elastic member 30. With this configuration, the abutment surface of the protruding portion 21 that abuts the elastic member 30 is limited to two surfaces, and the protruding portion 21 is prevented from biting into the elastic member 30 more than required. As a result, degradation of the elastic member 30 is suppressed.

In addition, as shown in FIGS. 10A and 10B, the protruding portion 21 may be configured such that ribs 21R are provided on an abutment surface 21b that abuts the elastic member 30. With this configuration, the protruding portion 21 is easily caught by the elastic member 30, and rattling in the Z-axis direction is suppressed.

The second stopper 25 is formed in a flat plate shape having the longitudinal direction in the X-axis direction and a predetermined thickness in the Y-axis direction. The second stopper 25 protrudes in the downward direction than the first and second sliding portions 23 and 24 and are integrally provided with the connecting portion 22. The second stopper 25 abuts a flat plate portion B1 on the side of the mounting part 2 housed in the housing space 14 at the stopping portion (FIG. 13B) of the slider 20.

(Elastic Member)

The elastic member 30 is a rectangular column having the longitudinal direction in the Y-axis direction, and is disposed in the housing portion 12. At this time, the elastic member 30 is held in the housing portion 12 by the holding portion 13 while being pressed in the X-axis direction by the protruding portion 21. This maintains the elastic member 30 constantly urged by the protruding portion 21. A pair of elastic members 30 is provided in the slide base part 10, and faces each other in the X-axis direction via the slider 20.

The shape of the elastic member 30 is typically a rectangular column, but is not limited thereto. For example, the shape of the elastic member 30 may be any shape such as a cylindrical, an elliptical column, and a triangular column.

Figure 11A:
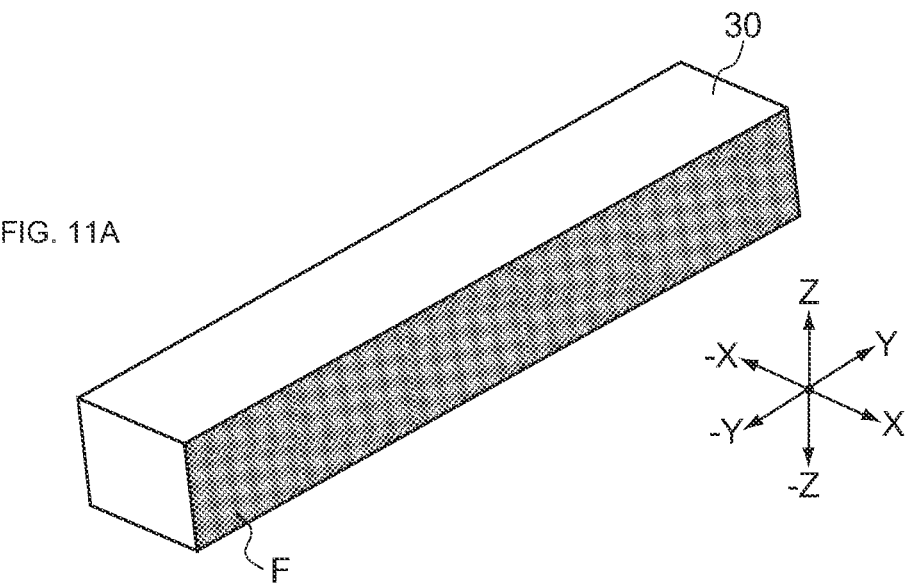
FIGS. 11A and 11B is a are perspective views showing a configuration example of an elastic member.
Figure 11B:
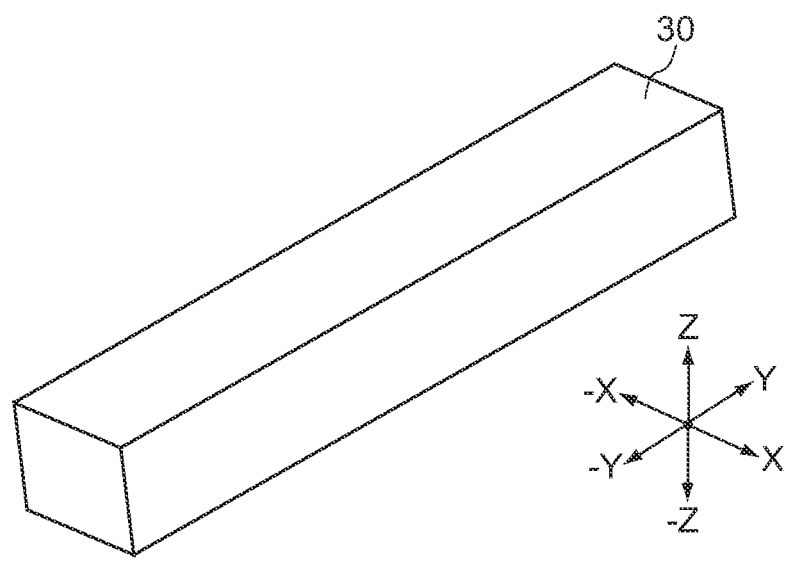

FIGS. 11A, 11B, 12A, and 12B are each a perspective view showing a configuration example of the elastic member 30. There is no particular limitation on the material forming the elastic member 30. There is no limitation on the type of the material, and silicon rubber or the like may be used. That is, the elastic member 30 itself may be formed of a single material (FIG. 11B). In this case, it is favorable that the material has a dynamic friction coefficient of 0.5 or less between the protruding portion 21 and the elastic member 30, and more favorably, the material has a dynamic friction coefficient of 0.3 or less. Further, the hardness of the elastic member 30 is favorably a durometer hardness A of approximately 30 degrees, for example.

Further, the elastic member 30 may be configured such that a film F is crimped on the surface to be pressed against the protruding portion 21 (Part (a) of FIG. 11A). In this case, the film F is not particularly limited, but is, for example, a film formed of Teflon (registered trademark) or silicon. Alternatively, the elastic member 30 may be configured such that fluorine coating or silicon coating is applied to the surface to be pressed against the protruding portion 21.

Figure 12A:
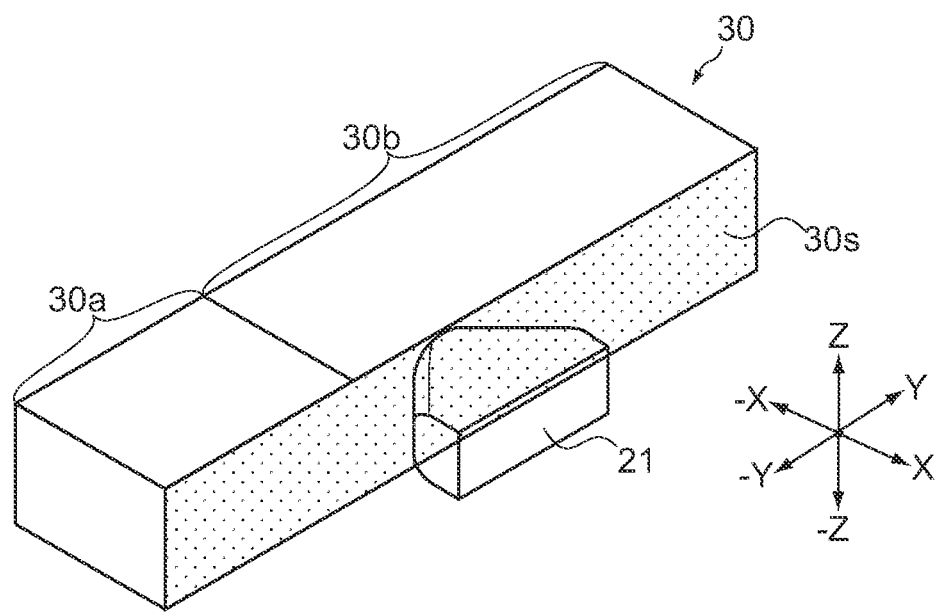
FIGS. 12A and 12B is a are perspective views showing a configuration example of the elastic member.
Figure 12B:
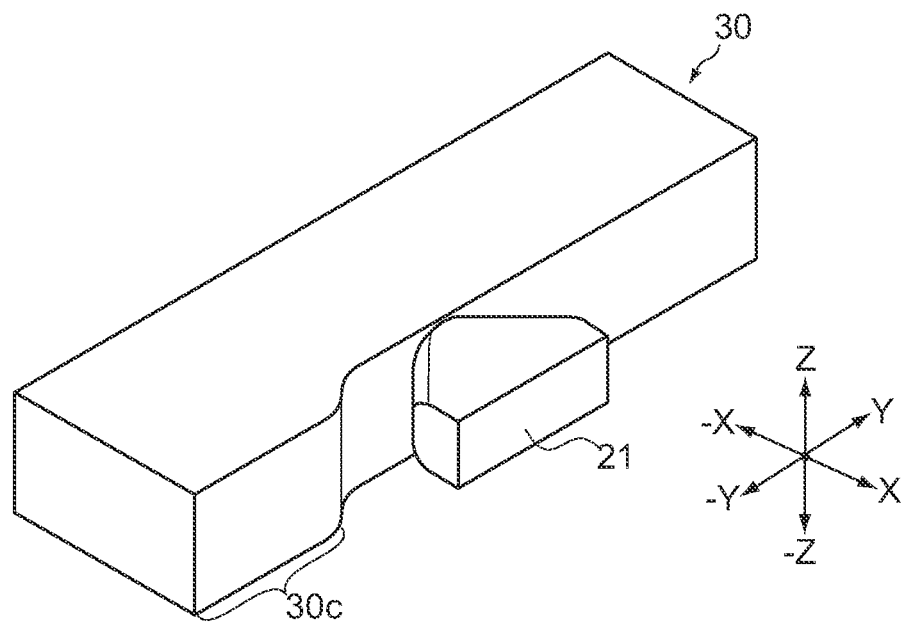

Further, the elastic member 30 may be configured such that the width in the X-axis direction differs in part (FIG. 12B). In this case, there may be a plurality of portions 30c (second elastic portions) having different widths in the X-axis direction, or the widths in the X-axis direction may be changed at a constant gradient.

In addition, the elastic member 30 may be configured to include a high-hardness member 30a (second elastic portion) and a low-hardness member 30b (first elastic portion). In this case, the high-hardness member 30a is formed of, for example, silicon having a durometer hardness A of approximately 50 degrees, and the low-hardness member 30b is formed of, for example, silicon having a durometer hardness A of approximately 30 degrees. The elastic member 30 including the high-hardness member 30a and the low-hardness member 30b is produced by, for example, two-color molding. Note that the elastic member 30 may be configured to include at least one or more of the high-hardness member 30a or the low-hardness member 30b.

[Operation of Drive Mechanism]

Figure 13A:
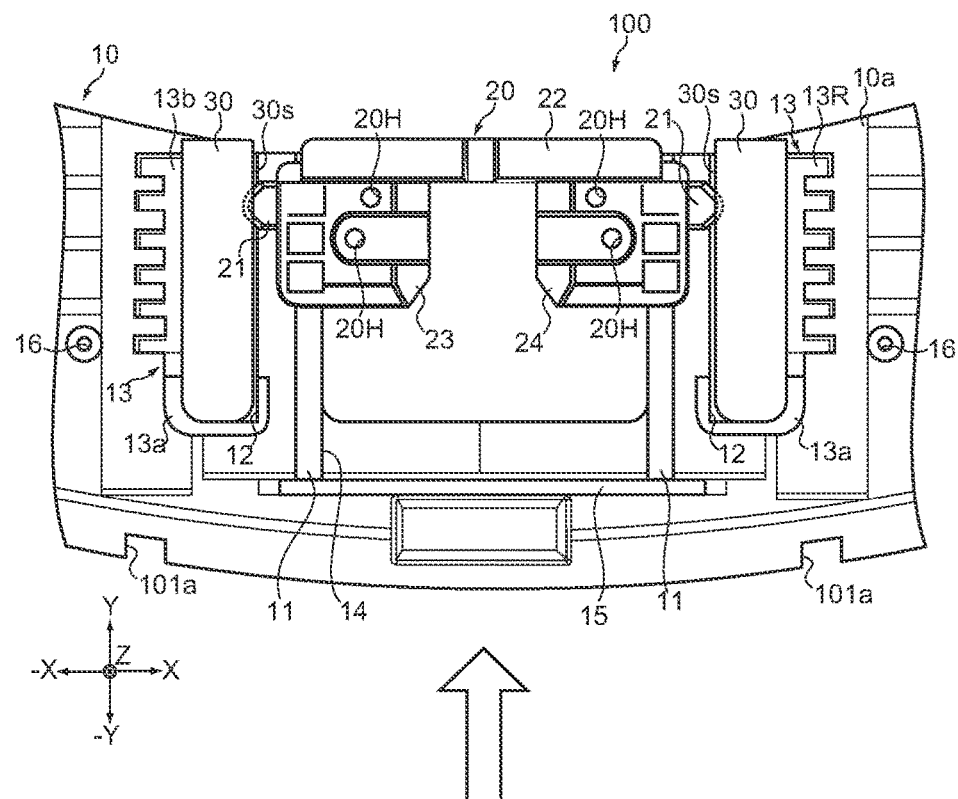
FIGS. 13A and 13B is a are diagrams showing the drive mechanism.
Figure 13B:
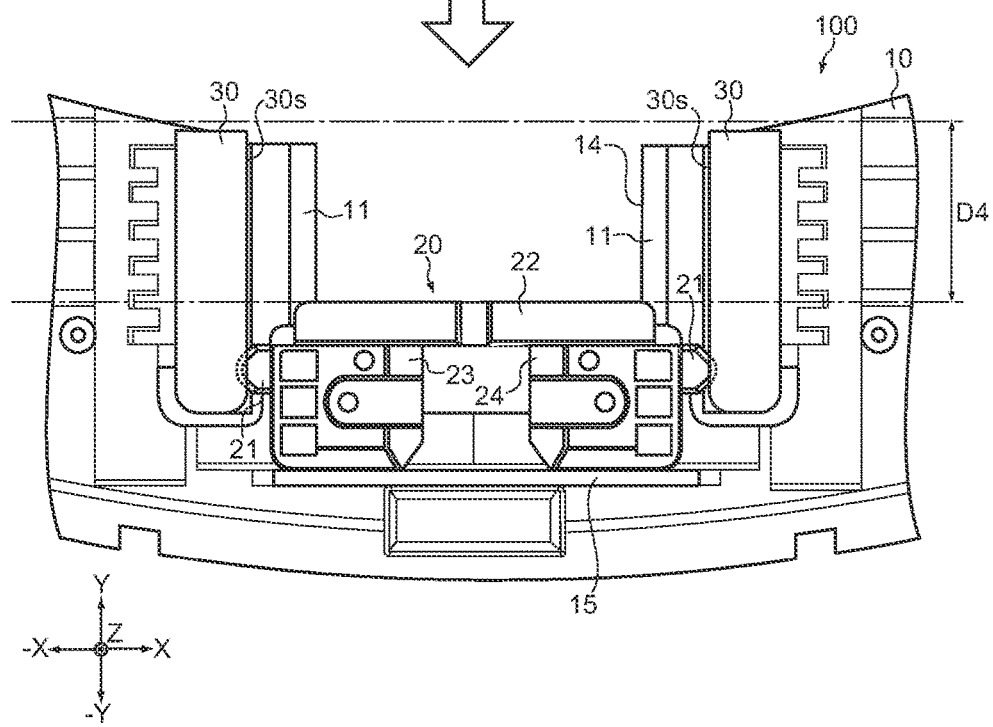
Figure 14:
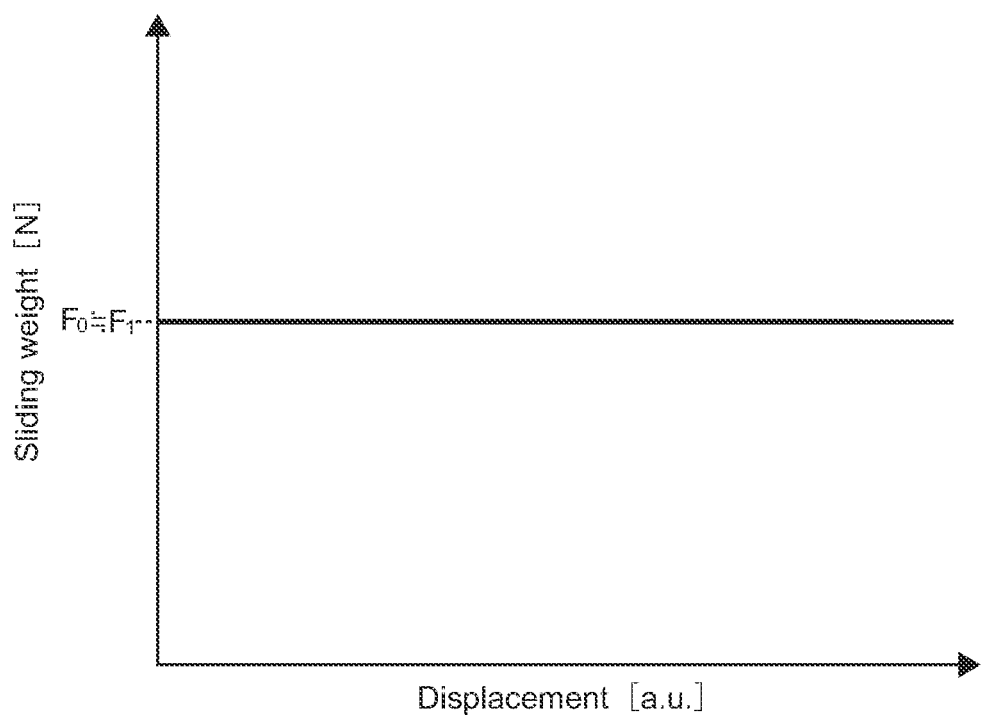
FIG. 14 is a graph showing the relationship between the sliding weight and the displacement in the drive mechanism.
Figure 15:
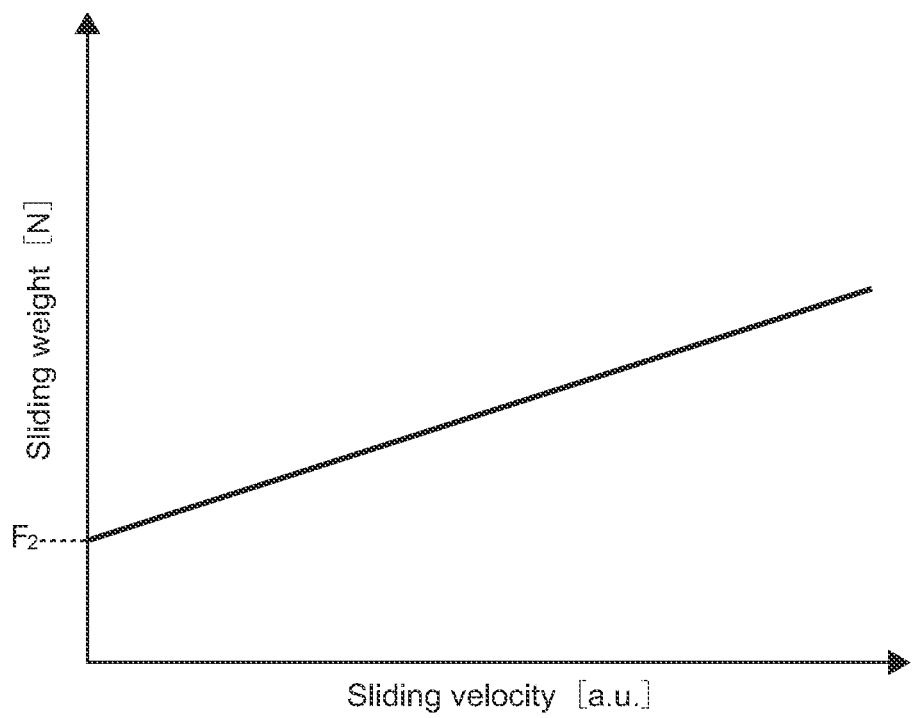
FIG. 15 is a graph showing the relationship between the sliding weight and the sliding velocity in the drive mechanism.
Figure 16C:
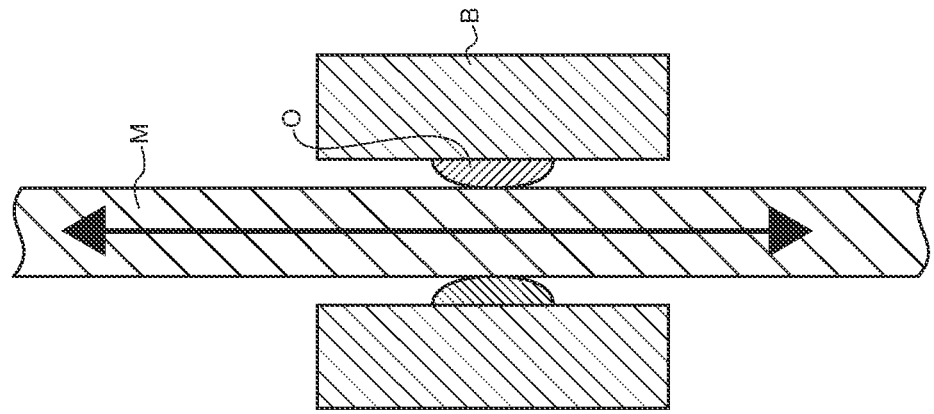
FIGS. 16A, 16B, and 16C is a are schematic diagrams showing a configuration example of an existing drive mechanism.
Figure 16B:
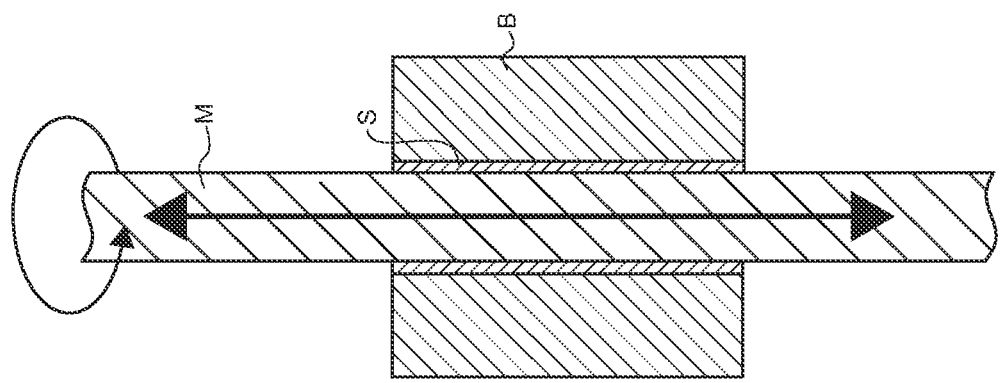

Next, the operation of the drive mechanism 100 according to this embodiment will be described. FIGS. 13A and 13B are diagrams showing the operation of the drive mechanism 100, and FIG. 14 is a graph showing the relationship between the sliding weight (weight applied to the slider 20) and the displacement in the drive mechanism 100. Further, FIG. 15 is a graph showing the relationship between the sliding weight and the sliding velocity in the drive mechanism 100. Here, prior to describing the operation of the drive mechanism 100 in detail, some examples of the existing drive mechanism will be described. Note that FIGS. 16A, 16B, and 16C are schematic diagrams schematically showing a configuration example of the existing drive mechanism.

Existing Example 1

Figure 16A:
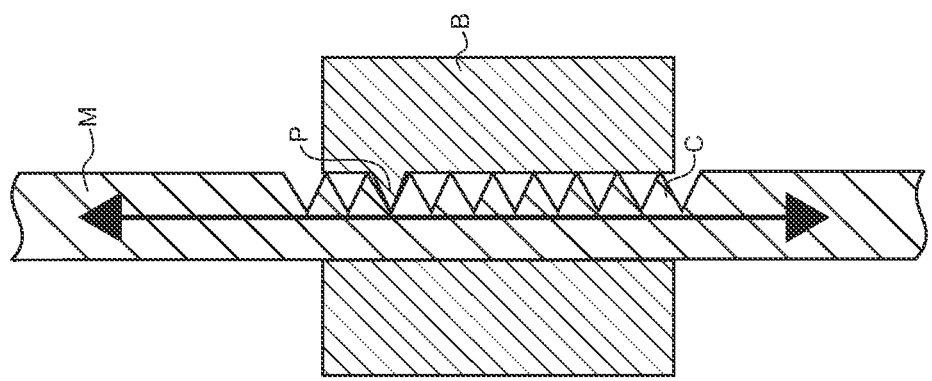

FIG. 16A is a schematic diagram schematically showing a position adjusting mechanism, which is an example of the existing drive mechanism. As shown in the figure, the position adjusting mechanism is configured such that the position thereof is adjusted by a click peak (projecting and recessed portion) C and a click spring P. In this case, the position adjustment can be made by simply applying a sliding weight to a movable part M, but the position adjustment is not stepless but is multi-step adjustment depending on the pitch of the click peak C. As a result, the relative position of the movable part M relative to a base part B cannot be a position desired by a user.

Existing Example 2

FIG. 16B is a schematic diagram schematically showing a screw feeding mechanism that is an example of the existing drive mechanism. The screw feeding mechanism is a complicated mechanism because it is configured to convert the rotational motion of the movable part M into linear motion. In addition, since the movable part M is slid in the axial direction by the rotational movement about the sliding direction of the movable part M, it is difficult to intuitively adjust the position of the movable part M.

Existing Example 3

Figure 17:
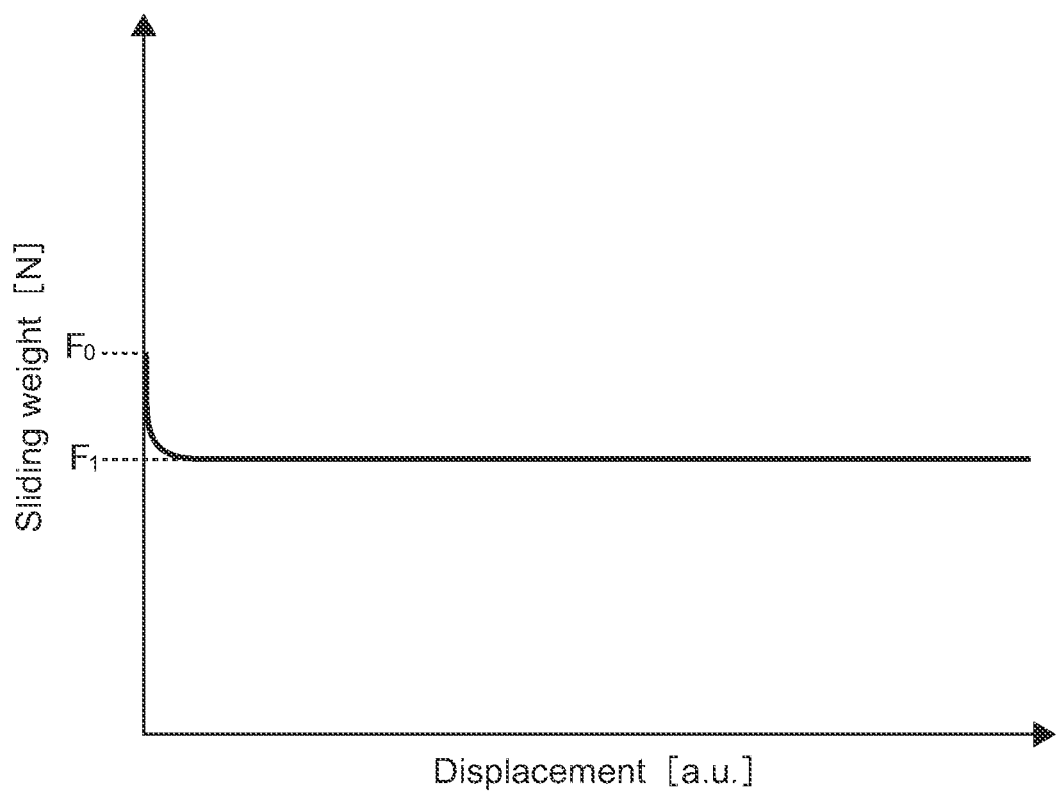
FIG. 17 is a graph showing the relationship between the sliding weight and the displacement of the existing drive mechanism.

FIG. 16C is a schematic diagram schematically showing a slide mechanism that is an example of the existing drive mechanism, and FIG. 17 is a graph showing the relationship between the sliding weight and the displacement of the slide mechanism. The slide mechanism is configured such that a weight for deforming an elastic member O such as a spring and an O-ring is applied to the movable part M to generate a sliding resistance between the movable part M and the elastic member O. In this case, the movable part M can be adjusted steplessly by only applying a simple sliding weight. Since the sliding resistance is only frictional force (friction coefficient x perpendicular drag from the elastic member O, etc.) and the dynamic friction coefficient is smaller than the static friction coefficient, an activation weight FO is larger than a motion weight F1. As a result, it becomes difficult to immediately stop the movable part M that has started to move, and make fine adjustment in adjusting the position of the movable part M.

Existing Example 4

Figure 18:
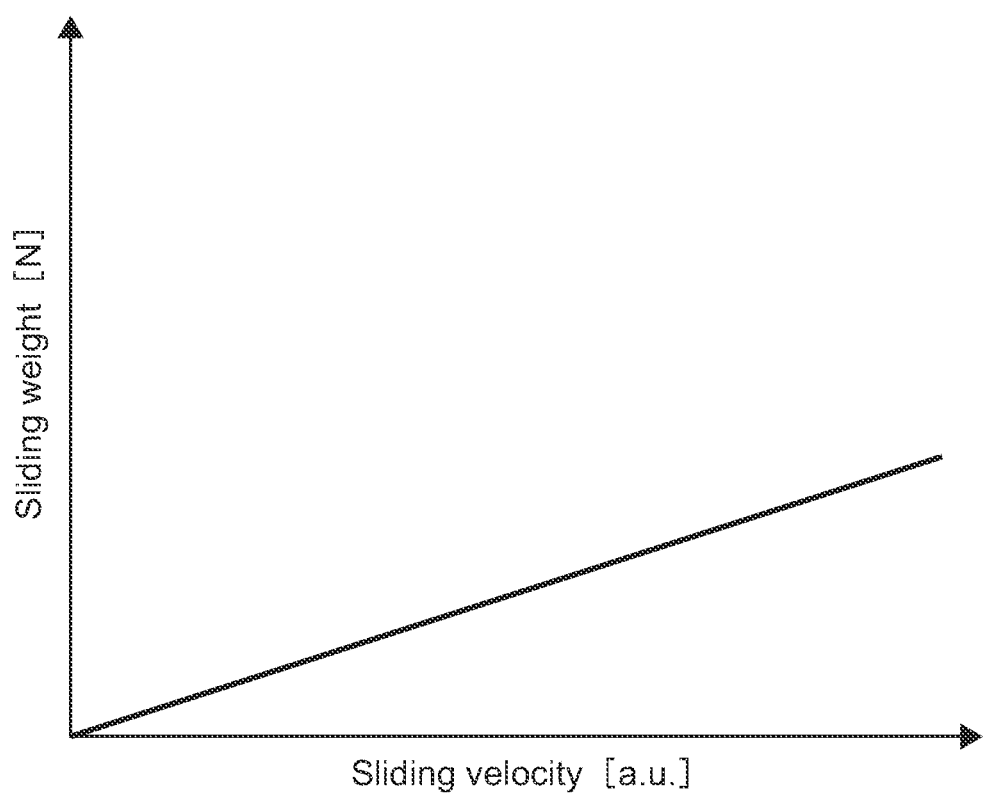
FIG. 18 is a graph showing the relationship between the sliding weight and the sliding velocity of the existing drive mechanism.

FIG. 18 is a graph showing the relationship between the sliding weight and the sliding velocity of a viscous damper, which is an example of the existing drive mechanism. While the viscous damper generates resistance by oil movement and is capable of exerting a large drag on a movable part (piston, etc.) when sliding, the weight applied to the movable part is 0 at rest, i.e., when the sliding velocity is 0, as shown in FIG. 18. Therefore, the movable part cannot be held at a position desired by a user.

In contrast to the existing drive mechanism described above, in the drive mechanism 100 according to this embodiment, when the slider 20 is subjected to external force in the Y-axis direction, the first and second sliding portions 23 and 24 supported by the guide-rail portion 11 slide on the guide-rail portion 11 steplessly along the Y-axis direction as shown in FIGS. 13A and 13B. At this time, since the protruding portion 21 of the slider 20 bites into the elastic member 30, the slider 20 moves along the Y-axis direction while constantly causing the protruding portion 21 to bite into the sliding surface 30s.

As a result, the slider 20 moves while constantly receiving the drag acting inward from the elastic member 30, and in particular, the drag applied to the inclined surface 21a at the time of moving becomes overwhelmingly large. Therefore, the activation weight $F_0$ applied to the slider 20 when the slider 20 is activated and the motion weight $F_1$ applied to the slider 20 when the slider 20 is caused to move can be made similar or equal to each other (see FIG. 14), so that the position of the slider 20 can be finely adjusted.

Further, in the drive mechanism 100 according to this embodiment, since the slider 20 constantly receives the drag acting inward from the elastic member 30, a constant holding weight $F_2$ is applied to the slider 20 even when the slider 20 is at rest (see FIG. 15). As a result, the relative position of the slider 20 relative to the slide base part 10 can be a position desired by a user, and the slider 20 is held at a position desired by the user.

As a result, in the drive mechanism 100 according to this embodiment, the relative position of the display unit 3 relative to the mounting part 2 can be steplessly adjusted and the display unit 3 can be held at the adjusted position.

Second Embodiment

Figure 19A:
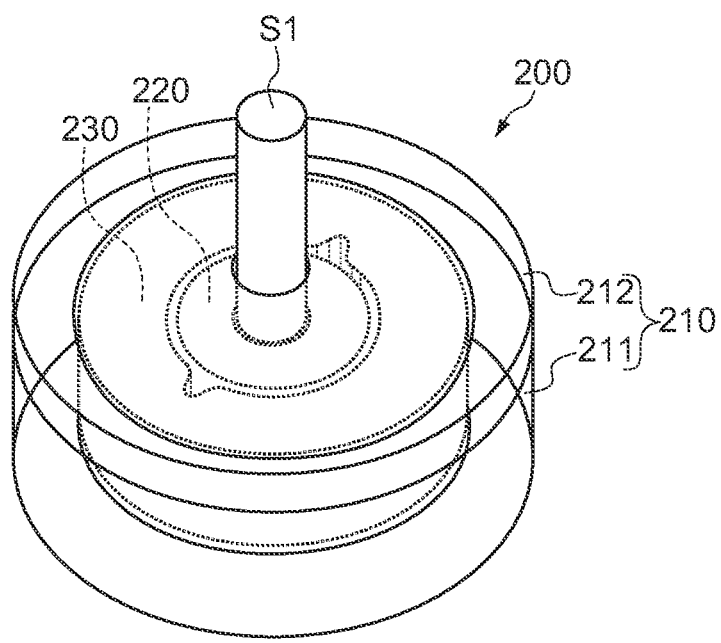
FIGS. 19A and 19B is a are diagrams showing a configuration example of a drive mechanism according to a second embodiment of the present technology.
Figure 19B:
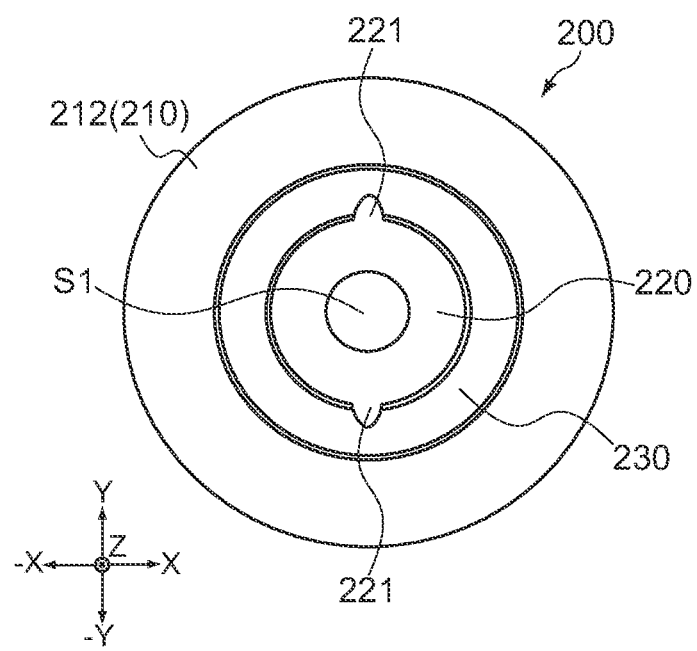

FIGS. 19A and 19B are diagrams showing a configuration example of a drive mechanism 200 according to a second embodiment of the present technology, FIG. 19A is a perspective view, and FIG. 19B is a top view. The drive mechanism 200 according to the second embodiment is different from the drive mechanism according to the first embodiment in that it is a rotating mechanism.

The drive mechanism 200 includes a rotation shaft S1, a rotor 220 (movable part), an elastic member 230, and an outer housing member 210 (base part).

The rotation shaft S1 is a cylindrical shaft extending in the Z-axis direction and is configured to be rotatable around the Z-axis. The rotor 220 is formed in a cylindrical shape and is supported by the rotation shaft S1. As shown in Part (b) of FIG. 19B, the rotor 220 includes a plurality of protruding portions 221 (latching portions) protruding radially outward about the Z-axis. The plurality of protruding portions 221 constantly bites into the elastic member 230. As a result, the rotor 220 is supported by the elastic member 230. Although there is no particular limitation on the material forming the rotor 220, for example, a synthetic resin such as plastic or a metallic material can be employed.

The elastic member 230 is formed in a cylindrical shape and disposed radially outward of the rotor 220, and faces the outer peripheral surface of the rotor 220 radially at a predetermined interval. Although there is no particular limitation on the material forming the elastic member 230, for example, silicone rubber may be employed.

The outer housing member 210 seals the rotor 220 and the elastic member 230, and includes a first outer housing portion 211 and a second outer housing portion 212. The first outer housing portion 211 houses the rotor 220 and the elastic member 230, and faces the entire outer peripheral surface of the elastic member 230.

The second outer housing portion 212 is placed on the main surface in the upward direction of the first outer housing portion 211, and covers the main surfaces in the upward direction of the rotor 220 and the elastic member 230. As shown in FIG. 19A, the second outer housing portion 212 is inserted through the rotation shaft S1. Although there is no particular limitation on the material forming the outer housing member 210, for example, a synthetic resin such as plastic or a metallic material can be employed.

Here, in the case where the drive mechanism 200 is a rotating mechanism as shown in FIGS. 19A and 19B, as the rotation shaft S1 rotates around the Z-axis, the rotor 220 also rotates around the Z-axis. At this time, the protruding portion 221 projecting radially outward of the rotor 220 rotates while deforming the inner peripheral surface (sliding surface) of the elastic member 230. As a result, the same operation and effect as those in the above-mentioned first embodiment can be achieved.

Third Embodiment

Figure 20A:
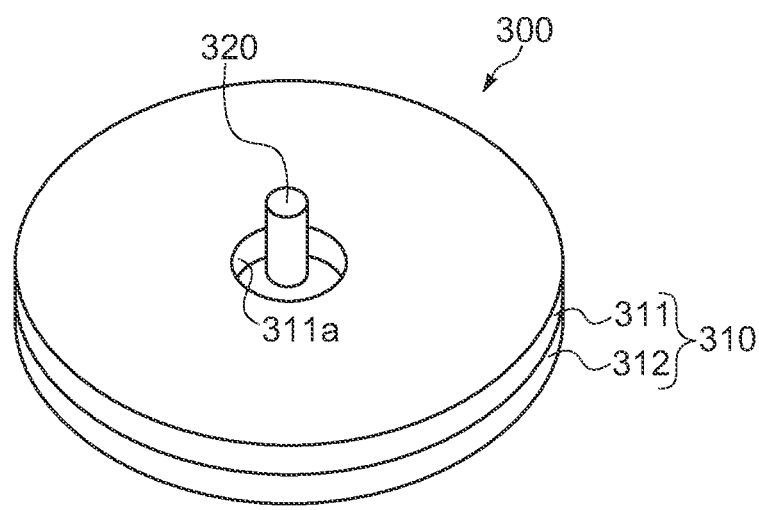
FIGS. 20A and 20B is a are diagrams showing a configuration example of a drive mechanism according to a third embodiment of the present technology.
Figure 20B:
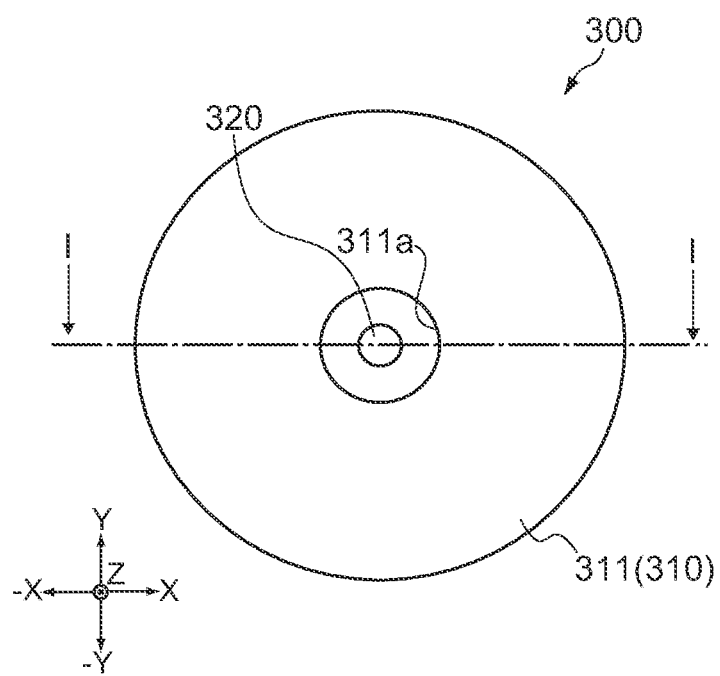
Figure 21:
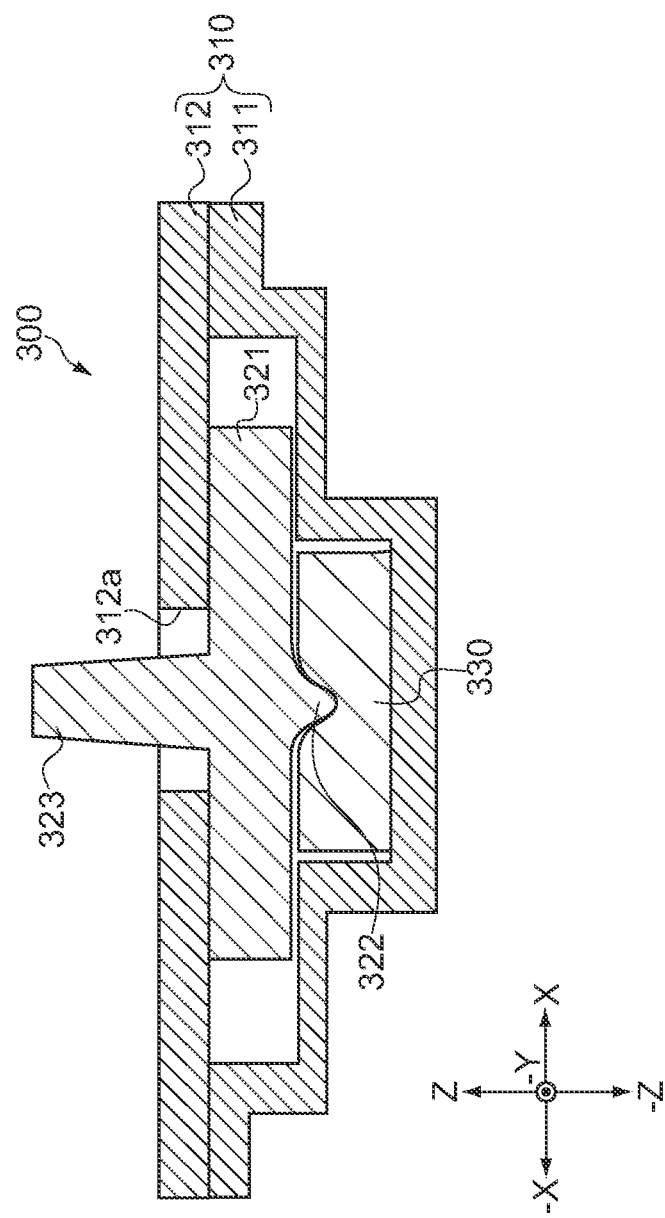
FIG. 21 is a cross-sectional view taken along the line I-I in FIGS. 20A and 20B.

FIGS. 20A, 20B, and FIG. 21 are each a diagram showing a configuration example of a drive mechanism 300 according to a third embodiment of the present technology, Part (a) of FIG. 20A is a perspective view, and Part (b) of FIG. 20B is a top view. Further, FIG. 21 is a cross-sectional view taken along the line in Part (b) of FIG. 20B.

The drive mechanism 300 according to the third embodiment is different from the drive mechanism according to the first embodiment in that it is a planar slide mechanism. The drive mechanism 300 includes a movable part 320, an elastic member 330, and an outer housing member 310 (base part).

The movable part 320 includes a movable part body 321, a shaft portion 323, and a protruding portion 322 (latching portion). The movable part body 321 is formed in a disk shape. The movable part body 321 abuts the main surface in the downward direction of the second outer housing portion 312, and faces the elastic member 330 and the first outer housing portion 311 at predetermined intervals in the downward direction.

In the drive mechanism 300 according to the third embodiment, a configuration in which the protruding portion 322 bites into the elastic member 330 while the movable part body 321 abuts the second outer casing 312 is adopted. That is, the movement of the movable part body 321 in the upward direction is regulated by the second outer casing 312, so that the elastic member 330 is constantly urged toward the protruding portion 322.

The shaft portion 323 is provided at the center of the main surface in the upward direction of the movable part body 321, and extends in the upward direction from the main surface. The shaft portion 323 is inserted through a through hole 312a provided in the second outer housing portion 312. The protruding portion 322 is provided coaxially with the shaft portion 323 and protrudes in the downward direction. The protruding portion 322 constantly bite into the elastic member 330.

The elastic member 330 is a cylinder having the longitudinal direction in the X-axis direction. Although there is no particular limitation on the material forming the elastic member 330, for example, silicone rubber may be employed.

The outer housing member 310 seals the movable part body 321 and the elastic member 330, and includes the first outer housing portion 311 and the second outer housing portion 312. The first outer housing portion 311 houses the movable part body 321 and the elastic member 330. The second outer housing portion 312 is placed on the first outer housing portion 311 and covers the main surface in the upward direction of the movable part body 321. As shown in FIG. 21, the second outer housing portion 312 is inserted through the shaft portion 323.

Although there is no particular limitation on the material forming the outer housing member 310, for example, a synthetic resin such as plastic or a metallic material can be employed.

Figure 22:
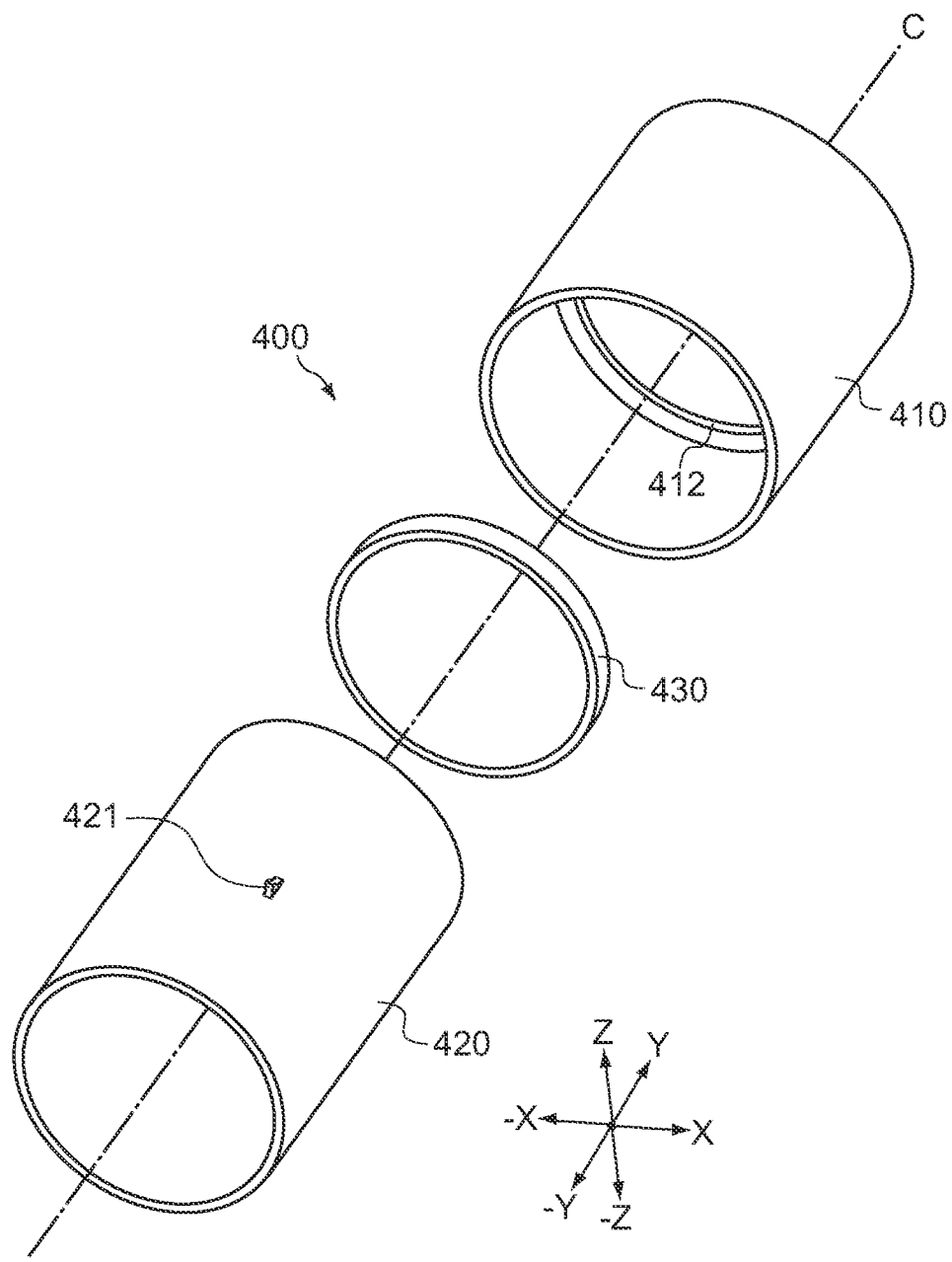
FIG. 22 is a diagram showing a configuration example of a drive mechanism according to a modified example of the present technology.

Here, in the case where the drive mechanism 300 is a planar slide mechanism as shown in FIG. 21 and FIG. 22, as the movable part body 321 moves along the XY plane (direction perpendicular to the protruding direction of the protruding portion 322), the protruding portion 322 of the movable part 320, which protrudes in the downward direction, slides while deforming the main surface in the upward direction (sliding surface) of the elastic member 330. As a result, the same operation and effect as those in the above-mentioned first embodiment can be achieved.

Modified Example

It is needless to say that the present technology is not limited to the above-mentioned embodiments, and various modifications can be made.

Figure 23:
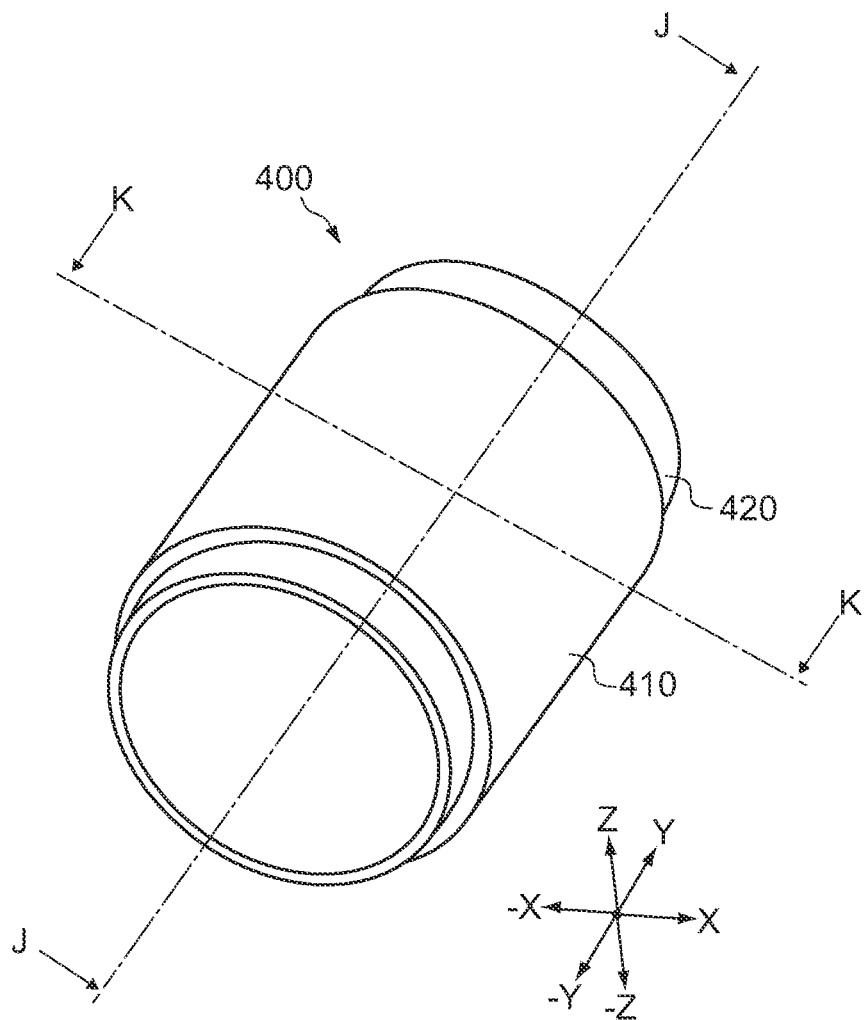
FIG. 23 is a diagram showing a configuration example of the drive mechanism according to the modified example of the present technology.
Figure 24A:
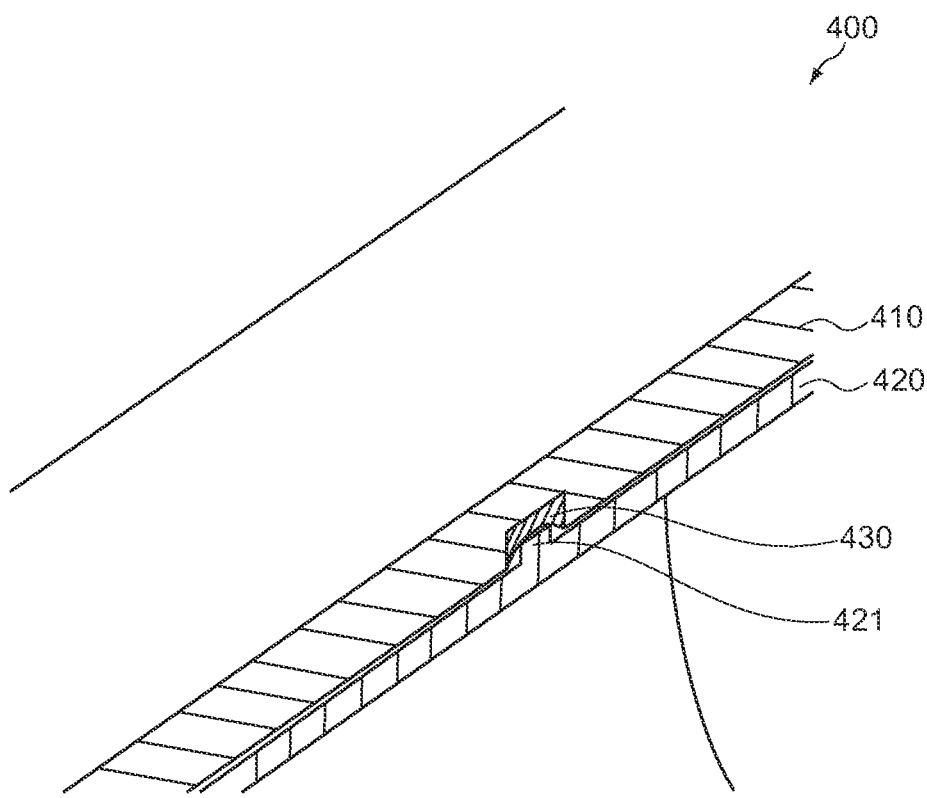
FIGS. 24A and 24B is a are diagrams showing a configuration example of the drive mechanism according to the modified example of the present technology.
Figure 24B:
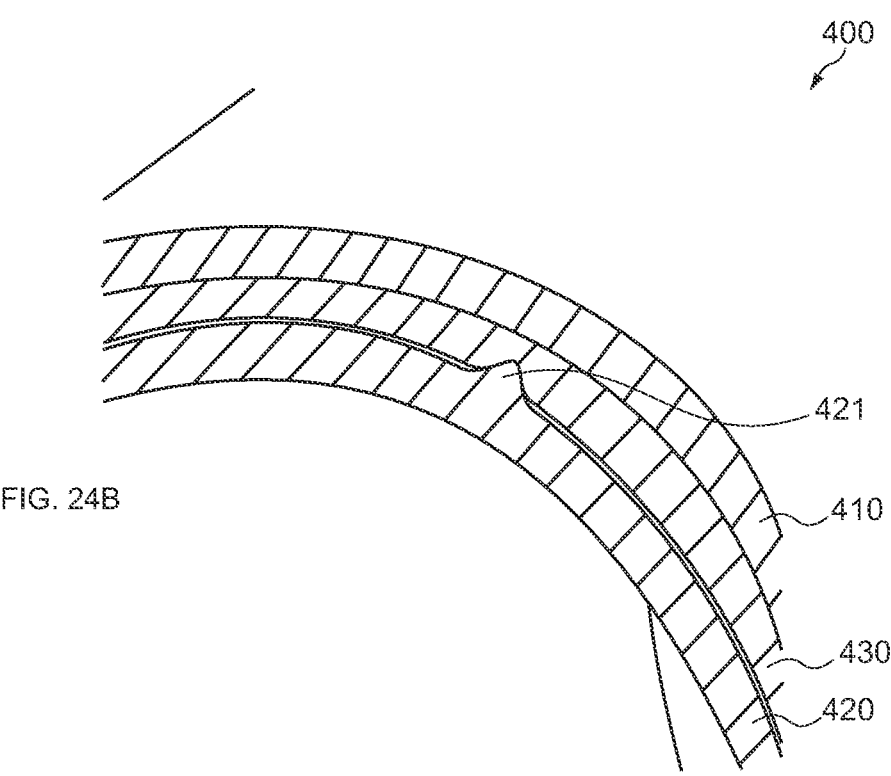
Figure 25:
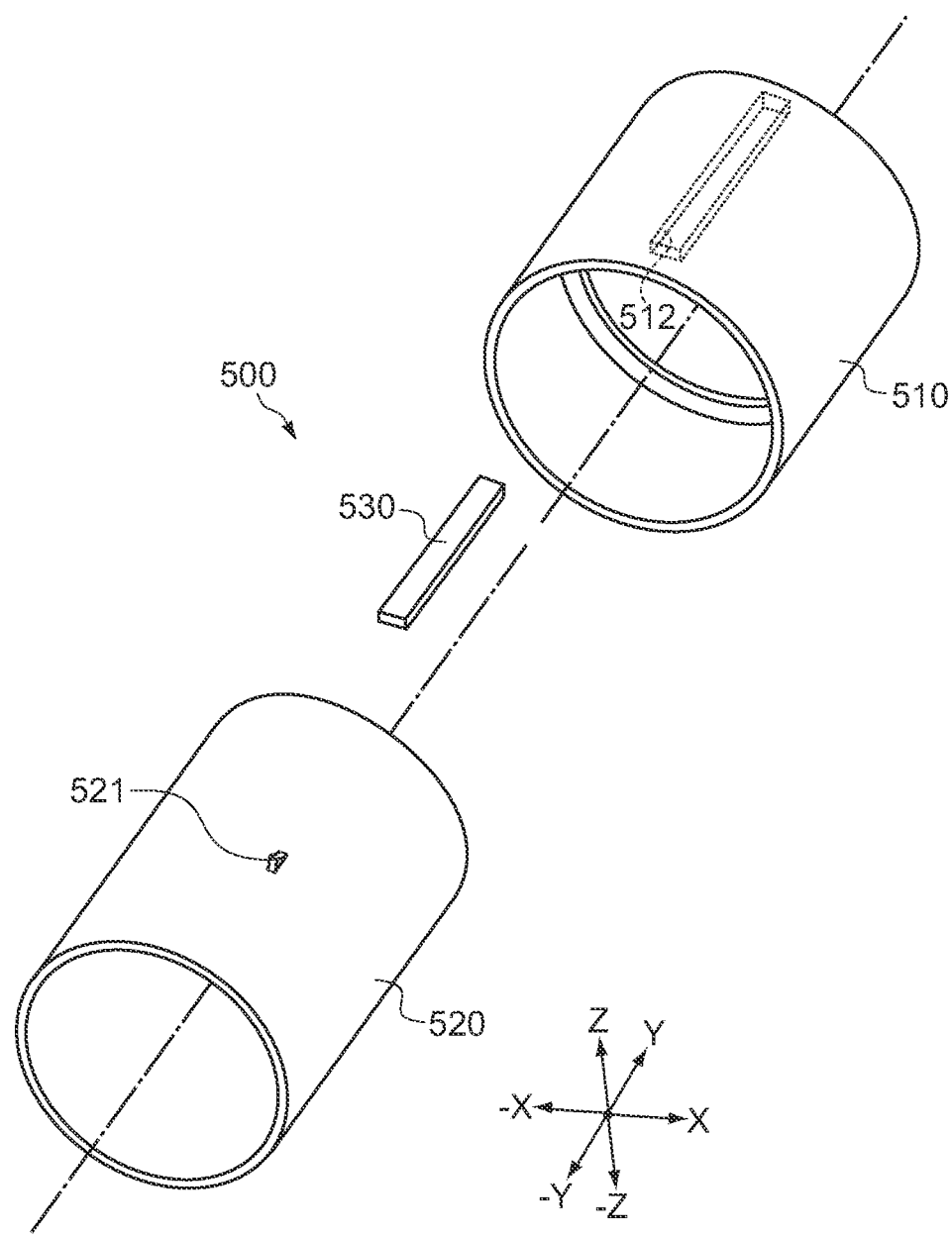
FIG. 25 is a diagram showing a configuration example of the drive mechanism according to the modified example of the present technology.
Figure 26:
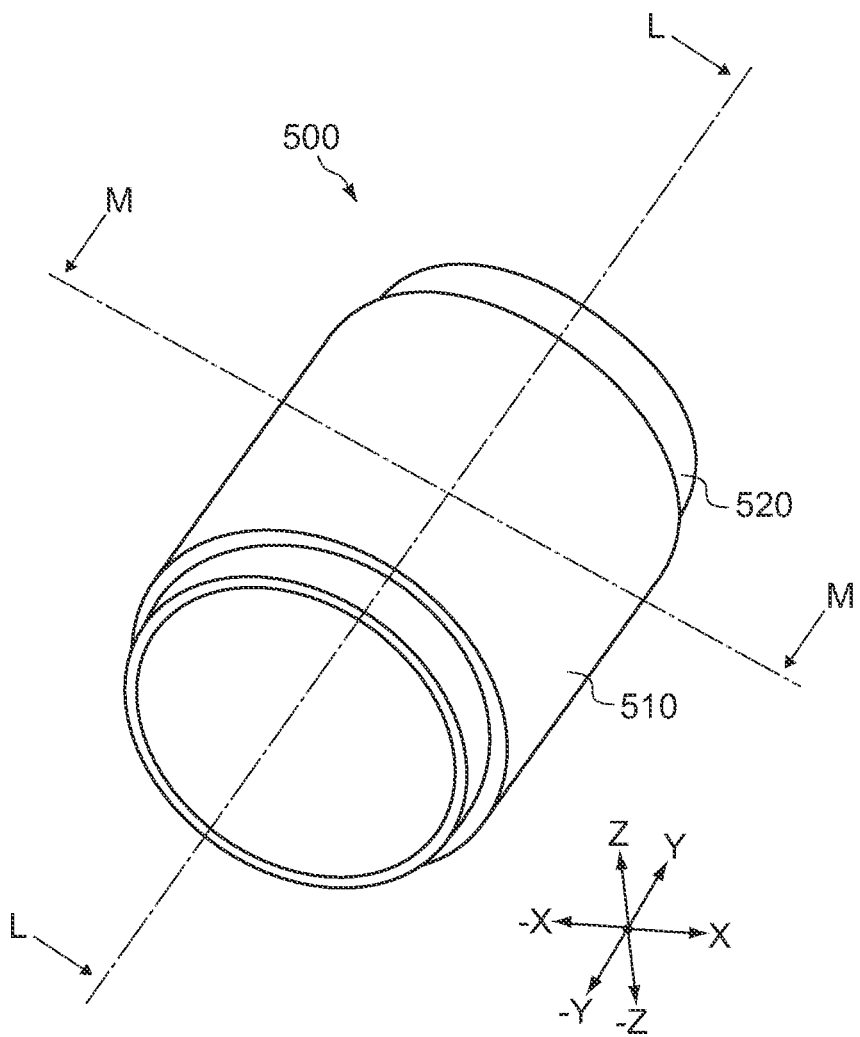
FIG. 26 is a diagram showing a configuration example of the drive mechanism according to the modified example of the present technology.
Figure 27A:
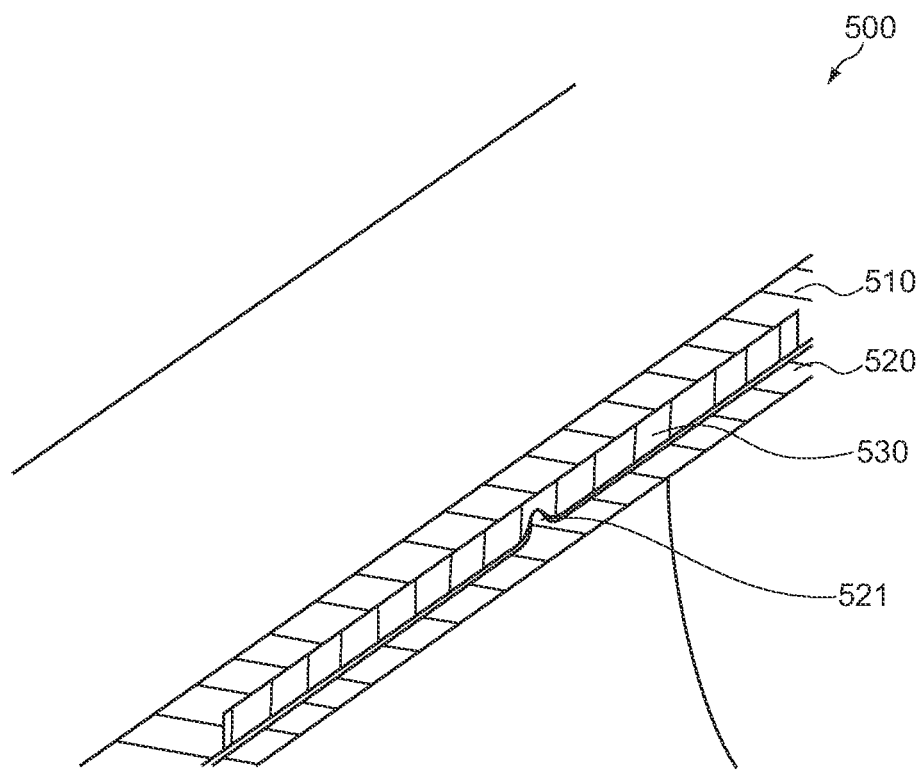
FIGS. 27A and 27B is a are diagrams showing a configuration example of the drive mechanism according to the modified example of the present technology.
Figure 27B:
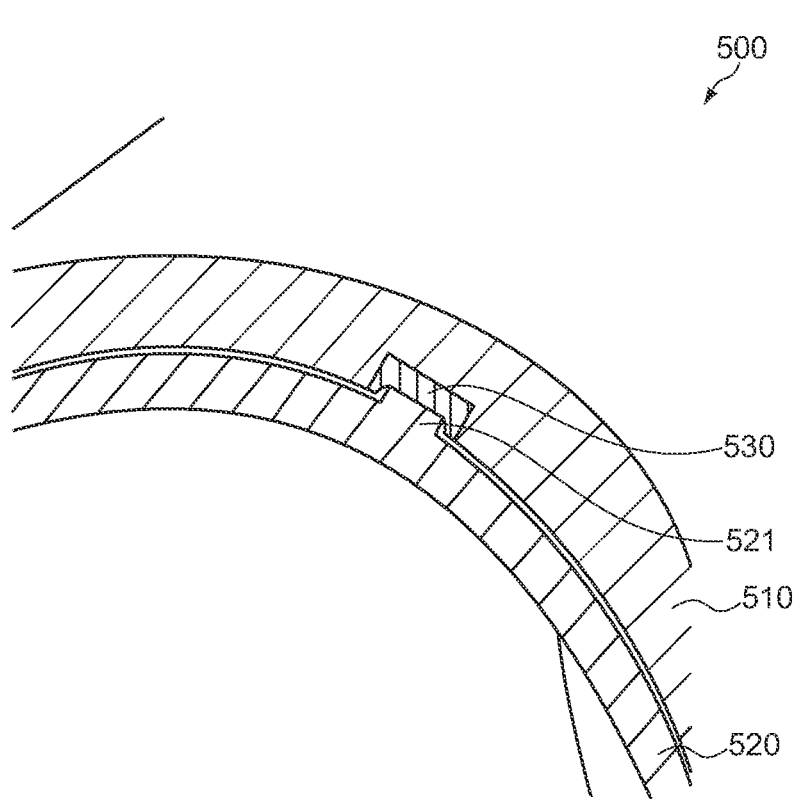
Figure 28:
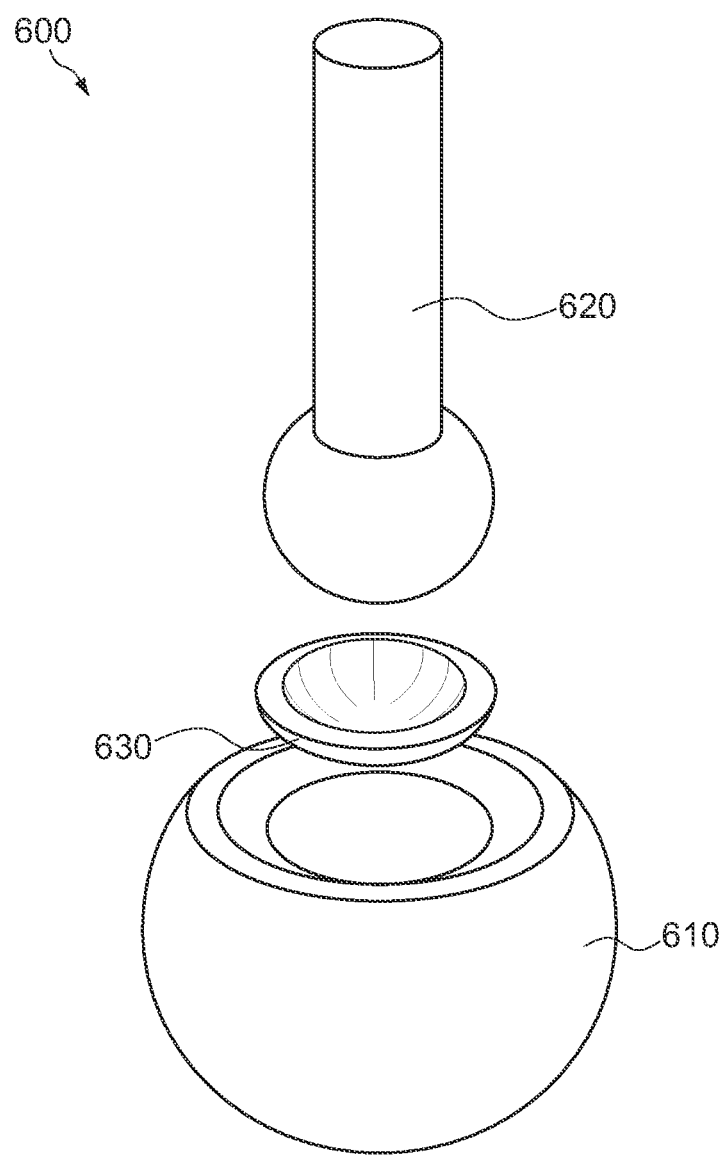
FIG. 28 is a diagram showing a configuration example of the drive mechanism according to the modified example of the present technology.
Figure 29:
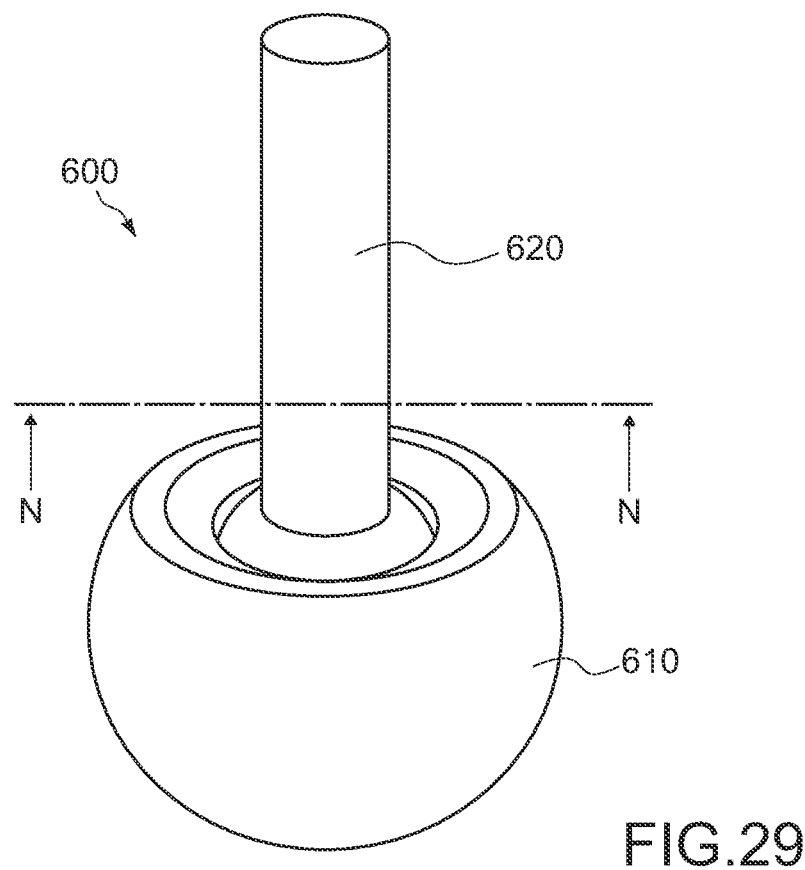
Figure 30:
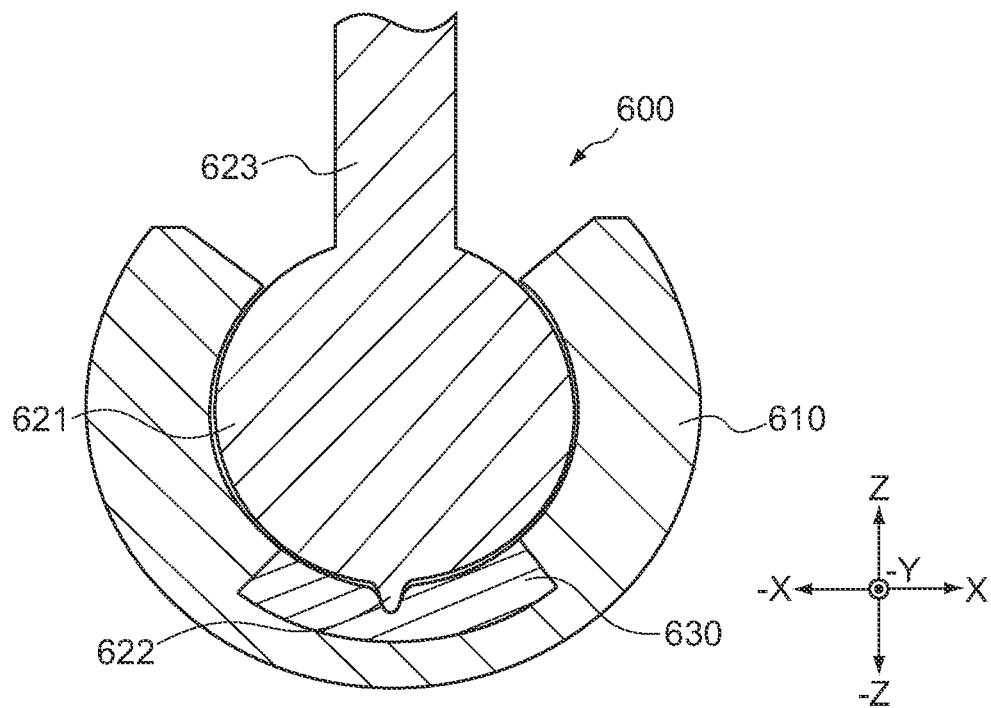

FIGS. 22, 23, 24A, 24B, 25, 26, 27A, 27B, 28, 29, and 30 are each a diagram showing a configuration example of each of drive mechanisms 400, 500, and 600 according to modified examples of the present technology, FIG. 22, FIG. 25, and FIG. 28 are each an exploded perspective view, and FIG. 23, FIG. 26, and FIG. 29 are each a perspective view. Further, FIG. 24A is a cross-sectional view taken along the line J-J in FIG. 23, and FIG. 24B is a cross-sectional view taken along the line K-K in FIG. 23. Further, FIG. 27A is a cross-sectional view taken along the line L-L in FIG. 26, and FIG. 27B is a cross-sectional view taken along the line M-M in FIG. 26. In addition, FIG. 30 is a cross-sectional view taken along the line N-N in FIG. 29.

In the above-mentioned embodiments, the drive mechanism is a slide adjusting mechanism, a rotating mechanism, or a planar slide mechanism, but the present technology is not limited thereto. For example, the drive mechanism according to the present technology may be a rotating mechanism as shown in FIGS. 22, 23, 24A, and 24B. In this case, a first cylindrical portion 420 (movable part) rotates relative to a first cylindrical portion 410 (base part) while a protruding portion 421 (latching portion) deforms an elastic member 430 housed in a housing portion 412.

Alternatively, the adjusting mechanism according to the present technology may be a slide mechanism as shown in FIGS. 25, 26, 27A, and 27B. In this case, a first cylindrical portion 520 (movable part) moves relative to a first cylindrical portion 510 (base part) while a protruding portion 521 (latching portion) deforms an elastic member 530 housed in a housing portion 512.

Alternatively, the drive mechanism according to the present technology may be a ball joint lever as shown in FIG. 28 to FIG. 30. In this case, a movable part 620 rotates about the Z-axis relative to a casing 610 (base part) while a protruding portion 622 (latching portion) deforms an elastic member 630.

In addition, in the above-mentioned embodiment, although a movable part is configured to be movable relative to a base part, the present technology is not limited thereto, and the base part may be configured to be movable relative to the movable part.

<Supplementary>

In addition, although the drive mechanism according to the present technology has been described on the assumption that it is typically applied to HMDs, the present technology is not limited thereto. For example, the drive mechanism may be applied to a clock band, a headband, a camera barrel, an eyewear other than HMDs, a torque hinge, a rotary knob, or the like, and its application is not particularly limited.

In addition, the effects described herein are illustrative or exemplary only and not restrictive. In other words, the present technology may have other effects apparent to those skilled in the art from the description herein together with the above-mentioned effects or in place of the above-mentioned effects.

While favorable embodiments of the present technology have been described in detail with reference to the accompanying drawings, the present technology is not limited to such examples. It will be apparent to those skilled in the art in the technological field of the present technology that various changes or modifications may be made within the scope of the technological ideas set forth in the appended claims, which are of course understood to fall within the technological scope of the present technology.

It should be noted that the present technology may also take the following configurations.

(1)

A drive mechanism, including:

a base part;

an elastic member that is provided in the base part; and a movable part that includes a latching portion that is latched onto the elastic member and is movable relative to the base part.

(2)

The drive mechanism according to (1) above, in which the latching portion is a protrusion that protrudes toward the elastic member and deforms the elastic member.

(3)

The drive mechanism according to (1) or (2) above, in which the latching portion has an abutment surface that abuts the elastic member, and the abutment surface includes a rib that bites into the elastic member.

(4)

The drive mechanism according to any one of (1) to (3) above, in which the latching portion has at least one of a triangular shape or a semicircular shape.

(5)

The drive mechanism according to any one of (1) to (4) above, in which the movable part includes a plurality of the latching portions.

(6)

The drive mechanism according to any one of (1) to (5) above, in which the elastic member includes a first elastic portion and a second elastic portion having a hardness higher than that of the first elastic portion.

(7)

The drive mechanism according to any one of (1) to (6) above, in which the elastic member includes a first elastic portion and a second elastic portion having a width of the latching portion in a protruding direction larger than that of the first elastic portion.

(8)

The drive mechanism according to any one of (1) to (7) above, in which the elastic member is formed in a columnar shape and has a sliding surface abutting the latching portion, and the latching portion causes the sliding surface to slide along a longitudinal direction of the elastic member.

(9)

The drive mechanism according to (8) above, in which the base part includes a holding portion that holds a pair of elastic members facing each other along a protruding direction of the latching portion, and the movable part is configured to be slidable on the base part while causing the latching portion to bite into the sliding surface along the longitudinal direction between one elastic member of the pair of elastic members and the other elastic member.

(10)

The drive mechanism according to (8) or (9) above, in which the base part includes a regulating portion that regulates sliding of the movable part along the longitudinal direction.

(11)

The drive mechanism according to any one of (1) to (7) above, in which the drive mechanism is a rotating mechanism in which the movable part is configured to be rotatable relative to the base part.

(12)

The drive mechanism according to any one of (1) to (7) above, in which the drive mechanism is a slide mechanism in which the movable part is configured to be movable relative to the base part along a direction perpendicular to a protruding direction of the latching portion.

(13)

A head-mounted display, including:

a display unit;

a mounting part that is to be mounted on a head of a user; and a drive mechanism that includes a base part that is provided in the mounting part, an elastic member that is provided in the base part, and a movable part that connects the base part and the display unit to each other and includes a latching portion, the latching portion being latched onto the elastic member and being configured to be movable relative to the base part.

REFERENCE SIGNS LIST

10 slide base part (base part)
20 slider (movable part)
21 protruding portion (latching portion)
30 elastic member
100, 200, 300, 400, 500, 600 drive mechanism

The invention claimed is:

1. A drive mechanism, comprising:

a base part;

an elastic member in the base part, wherein the elastic member is in a columnar shape and has a sliding surface;

a movable part that includes a latching portion that is latched onto the elastic member and is movable relative to the base part; and a guide-rail portion in the base part, wherein the guide-rail portion is located parallel to the elastic member, and the guide-rail portion regulates sliding of the movable part along a longitudinal direction of the elastic member.

2. The drive mechanism according to claim 1, wherein the latching portion is a protrusion that protrudes toward the elastic member and deforms the elastic member.

3. The drive mechanism according to claim 2, wherein the latching portion has an abutment surface that abuts the elastic member, and the abutment surface includes a rib that bites into the elastic member.

4. The drive mechanism according to claim 2, wherein the latching portion has at least one of a triangular shape or a semicircular shape.

5. The drive mechanism according to claim 2, wherein the movable part includes a plurality of the latching portions.

6. The drive mechanism according to claim 2, wherein the elastic member includes a first elastic portion and a second elastic portion, and the second elastic portion has a hardness higher than that of the first elastic portion.

7. The drive mechanism according to claim 2, wherein the elastic member includes a first elastic portion and a second elastic portion, and the second elastic portion has a width of the latching portion in a protruding direction larger than that of the first elastic portion.

8. The drive mechanism according to claim 2, wherein the sliding surface abuts the latching portion of the movable part, and
the latching portion causes the sliding surface to slide along the longitudinal direction of the elastic member.

9. The drive mechanism according to claim 8, wherein the base part includes a holding portion that holds a pair of elastic members facing each other along a protruding direction of the latching portion, and the movable part is slidable on the base part while causing the latching portion to bite into the sliding surface along the longitudinal direction between first elastic member of the pair of elastic members and second elastic member of the pair of elastic members.

10. The drive mechanism according to claim 2, wherein the drive mechanism is a rotating mechanism in which the movable part is rotatable relative to the base part.

11. The drive mechanism according to claim 2, wherein the drive mechanism is a slide mechanism in which the movable part is movable relative to the base part along a direction perpendicular to a protruding direction of the latching portion.

12. A head-mounted display, comprising:
a display unit;
a mounting part that is to be mounted on a head of a user; and
a drive mechanism that includes
a base part that is provided in the mounting part,
an elastic member in the base part, wherein the elastic member is in a columnar shape and has a sliding surface,
a movable part that connects the base part to the display unit and includes a latching portion, the latching portion being latched onto the elastic member and being movable relative to the base part, and
a guide-rail portion in the base part, wherein
the guide-rail portion is located parallel to the elastic member, and
the guide-rail portion regulates sliding of the movable part along a
longitudinal direction of the elastic member.

* * * * *